United States Patent
Satoh et al.

(10) Patent No.: US 7,130,754 B2
(45) Date of Patent: Oct. 31, 2006

(54) SENSOR CALIBRATION APPARATUS, SENSOR CALIBRATION METHOD, PROGRAM, STORAGE MEDIUM, INFORMATION PROCESSING METHOD, AND INFORMATION PROCESSING APPARATUS

(75) Inventors: Kiyohide Satoh, Kanagawa (JP); Shinji Uchiyama, Kanagawa (JP); Toshihiro Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/892,104

(22) Filed: Jul. 16, 2004

(65) Prior Publication Data
US 2004/0249594 A1   Dec. 9, 2004

Related U.S. Application Data

(62) Division of application No. 10/390,739, filed on Mar. 19, 2003, now Pat. No. 6,792,370.

(30) Foreign Application Priority Data

Mar. 19, 2002  (JP) .............................. 2002-076760
Sep. 27, 2002  (JP) .............................. 2002-284244

(51) Int. Cl.
 *G01C 17/38*  (2006.01)
 *G01C 9/00*   (2006.01)
 *G06K 9/00*   (2006.01)
(52) U.S. Cl. .................... 702/95; 702/150; 702/152; 702/153; 38/154; 38/284
(58) Field of Classification Search .................. 702/94, 702/95, 150, 151, 152, 153; 382/154, 285, 382/282, 284; 345/419
See application file for complete search history.

(56) References Cited

U.S. PATENT DOCUMENTS

| 6,442,293 | B1* | 8/2002 | Ito et al. .................... 382/154 |
| 6,473,717 | B1* | 10/2002 | Claussen et al. ............ 702/153 |
| 6,522,312 | B1 | 2/2003 | Ohshima et al. ............... 345/8 |
| 6,697,761 | B1* | 2/2004 | Akatsuka et al. ........... 702/151 |
| 6,968,079 | B1 | 11/2005 | Yoshikawa et al. ......... 382/145 |
| 7,038,699 | B1 | 5/2006 | Sato et al. .................. 345/633 |

(Continued)

FOREIGN PATENT DOCUMENTS

CN    1275022 A    11/2000

(Continued)

OTHER PUBLICATIONS

S. Uchiyama, et al., "A Software Platform for Mixed Reality Systems", Proceedings of 6th Annual Conference of the Virtual Reality Society of Japan, pp. 457-460 (Sep. 19, 2001).

(Continued)

*Primary Examiner*—Michael Nghiem
*Assistant Examiner*—Meagan S Walling
(74) *Attorney, Agent, or Firm*—Fitzpatrick, Cella, Harper & Scinto

(57) ABSTRACT

A calibration information calculation unit 340 calculates the first coordinate positions of feature points included in images obtained by an image sensing apparatus at timings from an instruction unit 350 using position data, on world coordinate system, of a plurality of feature points held by a world coordinate holding unit 310 and the measured values of a position/posture sensor 130 input to a data management unit 330 at the timings. The unit 340 receives the second coordinate positions, which are acquired by an image coordinate acquisition unit 320, of the feature points included in the images obtained by the image sensing device at the timings. The unit 340 calculates calibration information using the first and second coordinate positions.

16 Claims, 22 Drawing Sheets

U.S. PATENT DOCUMENTS

| | | | |
|---|---|---|---|
| 2002/0095265 A1 | 7/2002 | Satoh et al. | 702/94 |
| 2002/0103617 A1 | 8/2002 | Uchiyama et al. | 702/150 |
| 2004/0048122 A1 | 3/2004 | Iizuka et al. | 345/634 |

FOREIGN PATENT DOCUMENTS

| | | |
|---|---|---|
| JP | 8-82505 A | 3/1996 |
| JP | 11-136706 | 5/1999 |
| JP | 2001-156135 | 6/2001 |
| JP | 2002-14054 | 1/2002 |
| JP | 2002-162206 | 6/2002 |
| JP | 2002-269585 | 9/2002 |
| JP | 2002-271692 | 9/2002 |
| JP | 2002-271693 | 9/2002 |

OTHER PUBLICATIONS

K. Sato, et al. "Registration of Physical and Virtual Spaces in Mixed Reality Systems", Proceedings of Seconds Annual Conference of the Virtual Reality Society of Japan, pp. 161-164 (Sep. 18, 1997).

S. Uchiyama, et al., "MR Platform: A Basic Body on Which Mixed Reality Applications Are Built", ISMAR 2002.

* cited by examiner

SENSOR CALIBRATION APPARATUS, SENSOR CALIBRATION METHOD, PROGRAM, STORAGE MEDIUM, INFORMATION PROCESSING METHOD, AND INFORMATION PROCESSING APPARATUS

CROSS REFERENCE TO RELATED APPLICATION

This application is a division of application Ser. No. 10/390,739, filed Mar. 19, 2003 now U.S. Pat. No. 6,792,370.

FIELD OF THE INVENTION

The present invention relates to a technique for calibrating a position/posture sensor, and a technique for obtaining parameters used upon transforming an output value of the position/posture sensor for the purpose of measuring the position and posture of an image sensing device using the position/posture sensor.

BACKGROUND OF THE INVENTION

In recent years, studies about mixed reality that aims at seamless joint of real and virtual spaces have been extensively made. An image display apparatus which presents mixed reality is implemented by superimposing an image of a virtual space (e.g., a virtual object, text information, and the like rendered by computer graphics) onto an image of a real space photographed by an image sensing device such as a video camera or the like.

As applications of such image display apparatus, new fields different from conventional virtual reality such as operation assistance that superimposes the state in a body onto the body surface of a patient, a mixed reality game in which a player fights against virtual enemies that swim on the real space, and the like are expected.

A common requirement for these applications involves the precision level of alignment between the real and virtual spaces, and many efforts have been conventionally made in this respect.

A problem of alignment in mixed reality amounts to obtaining the three-dimensional (3D) position and posture of an image sensing device on a world coordinate system set on the real space (to be simply referred to as a world coordinate system hereinafter). As a method of solving these problems, it is a common practice to use a 3D position/posture sensor such as a magnetic sensor, ultrasonic wave sensor, and the like.

In general, the output value of a 3D position/posture sensor indicates the position and posture of a measurement point on a sensor coordinate system which is uniquely defined by the sensor, but is not that of the image sensing device on the world coordinate system. Taking the Polhemus FASTRAK (magnetic sensor) as an example, the position and posture of a receiver on a coordinate system defined by a transmitter are obtained as the sensor output. Therefore, the sensor output value cannot be directly used as the position and posture of the image sensing device on the world coordinate system, and must undergo some calibration processes. More specifically, coordinate transformation that transforms the position and posture of a measurement point into those of the image sensing device, and coordinate transformation that transforms the position and posture on the sensor coordinate system into those on the world coordinate system are required. In this specification, information used to transform the sensor output value into the position and posture of the image sensing device on the world coordinate system will be referred to as calibration information.

FIG. 1 is a block diagram showing the functional arrangement of a general image display apparatus which presents mixed reality.

A display screen 110 and video camera 120 are fixed to a head-mount unit 100. When the user (not shown) wears the head-mount unit 100 so that the display screen 110 is located in front of the user's eye, a scene in front of the user's eye is captured by the video camera 120. Therefore, if the image captured by the video camera 120 is displayed on the display screen 110, the user observes a scene in front of the eye, which the user may observe by the naked eye if he or she does not wear the head-mount unit 100, via the video camera 120 and display screen 110.

A position/posture sensor 130 is a device for measuring the position and posture of a measurement point, fixed to the head-mount unit 100, on the sensor coordinate system, and comprises, e.g., the Polhemus FASTRAK as a magnetic sensor including a receiver 131, transmitter 133, and sensor controller 132. The receiver 131 is fixed to the head-mount unit 100 as a measurement point, and the sensor controller 132 measures and outputs the position and posture of the receiver 131 on the sensor coordinate system with reference to the position and posture of the transmitter 133.

On the other hand, an arithmetic processing unit 170 comprises a position/posture information transformer 140, memory 150, and image generator 160, and can be implemented by, e.g., a single versatile computer. The position/posture information transformer 140 transforms a measurement value input from the position/posture sensor 130 in accordance with calibration information held by the memory 150 so as to calculate the position and posture of the video camera 120 on the world coordinate system, and outputs the calculated position and posture as position/posture information. The image generator 160 generates a virtual image in accordance with the position/posture information input from the position/posture information transformer 140, superimposes that virtual image on an actual image captured by the video camera 120, and outputs superimposed that. The display screen 110 receives an image from the image generator 160, and displays it. With the above arrangement, the user (not shown) can experience as if a virtual object were present on the real space in front of the user's eye.

A method of calculating the position and posture of the video camera on the world coordinate system by the position/posture information transformer 140 will be described below using FIG. 2. FIG. 2 is a view for explaining the method of calculating the position and posture of the video camera on the world coordinate system.

In FIG. 2, let $M_{TW}$ be the position and posture of a sensor coordinate system 210 (a coordinate system having the position of the transmitter 133 as an origin) on a world coordinate system 200, $M_{ST}$ be the position and posture of the measurement point (i.e., the receiver 131) of the position/posture sensor 130 on the sensor coordinate system 210, $M_{CS}$ be the position and posture of the video camera 120 viewed from the measurement point of the position/posture sensor 130, and $M_{CW}$ be the position and posture of the video camera 120 on the world coordinate system 200. In this specification, the position and posture of object B on coordinate system A are expressed by a viewing transformation matrix $M_{BA}$ (4×4) from coordinate system A to coordinate system B (local coordinate system with reference to object B).

At this time, $M_{CW}$ can be given by:

$$M_{CW} = M_{CS} \cdot M_{ST} \cdot M_{TW} \qquad (A)$$

In equation (A), $M_{ST}$ is the input from the position/posture sensor 130 to the position/posture information transformer 140, $M_{CW}$ is the output from the position/posture information transformer 140 to the image generator 160, and $M_{CS}$ and $M_{TW}$ correspond to calibration information required to transform $M_{ST}$ into $M_{CW}$. The position/posture information transformer 140 calculates $M_{CW}$ based on equation (A) using MST input from the position/posture sensor 130, and $M_{CS}$ and $M_{TW}$ held in the memory 150, and outputs it to the image generator 160.

In order to attain accurate alignment between the real and virtual spaces, accurate calibration information must be set in the memory 150 by some means. A virtual image which is accurately aligned in the real space can be displayed only when the accurate calibration information is given.

Note that the holding form of the calibration information in the memory 150 is not limited to the viewing transformation matrix, and any other forms may be adopted as long as information can define the position and posture of one coordinate system viewed from the other coordinate system. For example, the position and posture may be expressed by a total of six parameters, i.e., three parameters that describe the position, and three parameters which express the posture using an Euler angle. Also, the posture may be expressed by four parameters, i.e., a three-valued vector that defines the rotation axis, and a rotation angle about that axis, or may be expressed by three parameters that express the rotation angle by the magnitude of the vector which defines the rotation axis.

Furthermore, the position and posture may be expressed by parameters which represent their inverse transformations (e.g., the position and posture of the world coordinate system 220 on the sensor coordinate system 210). In any of these cases, the position and posture of an object on a 3D space have only six degrees of freedom (three degrees of freedom for the position, and three degrees of freedom for the posture). Hence, unknown parameters required for calibration for this image display apparatus are a total of 12 parameters, i.e., six parameters required for transformation from the world coordinate system to the sensor coordinate system, and six parameters required for transformation from the position and posture of the measurement point to those of the video camera.

As one of known methods for setting the calibration information, the user or operator interactively changes 12 parameters (or 12 or more equivalent parameters) used to define $M_{CS}$ and $M_{TW}$ stored in the memory 150 via an input means (not shown), and makes adjustment by trial and error until accurate alignment is achieved.

Also, according to a calibration method proposed by Japanese Patent Application No. 2001-050990 (US AA 2002-95265), if one of $M_{CS}$ and $M_{TW}$ is obtained by some method, the remaining unknown parameters can be easily derived using a virtual image generated based on position/posture information fixed to a given value as a visual queue.

However, in the former method, since 12 unknown parameters must be adjusted at the same time, adjustment takes much time, and accurate calibration information cannot always be obtained. In the latter method, trial & error operations or operations using some calibration tool must be done upon deriving a parameter as a known one. Hence, these methods still have room for improvement.

The present invention has been made in consideration of the aforementioned problems, and has as its object to easily acquire calibration information required to transform the position and posture of an image sensing device measured by a sensor into those on a world coordinate system without using any special calibration tool.

SUMMARY OF THE INVENTION

In order to achieve the above object, for example, a sensor calibration method of the present invention comprises the following arrangement.

That is, a sensor calibration method for calculating calibration information of a position/posture sensor used to measure a position and posture of an image sensing device, characterized by comprising:

a sensor measured value input step of inputting measured values of the position/posture sensor obtained when the image sensing device is located at a plurality of image sensing positions and postures;

an image coordinate position input step of inputting values of image coordinate positions of a plurality of feature points on captured images sensed by the image sensing device at the plurality of image sensing positions and postures;

a world coordinate position input step of inputting values of world coordinate positions of the plurality of feature points on a world coordinate system; and a calibration information calculation step of calculating the calibration information on the basis of the sensor measured values, actually measured values of the image coordinate positions of the feature points, and the world coordinate positions of the feature points.

In order to achieve the above object, for example, a sensor calibration apparatus of the present invention comprises the following arrangement.

That is, a sensor calibration apparatus for calculating calibration information of a position/posture sensor used to measure a position and posture of an image sensing device, characterized by comprising:

a sensor measured value input unit adapted to input measured values of the position/posture sensor obtained when the image sensing device is located at a plurality of image sensing positions and postures;

an image coordinate position input unit adapted to input values of image coordinate positions of a plurality of feature points on captured images sensed by the image sensing device at the plurality of image sensing positions and postures;

a world coordinate position input unit adapted to input values of world coordinate positions of the plurality of feature points on a world coordinate system; and a calibration information calculation unit adapted to calculate the calibration information on the basis of the sensor measured values, actually measured values of the image coordinate positions of the feature points, and the world coordinate positions of the feature points.

In order to achieve the above object, for example, a sensor calibration method of the present invention comprises the following arrangement.

That is, an information processing method for calculating parameters required to transform a position and posture of an image sensing unit measured by a sensor into a position and posture on a world coordinate system, comprising the step of:

acquiring a plurality of captured images obtained by sensing images of a real space on which a plurality of markers whose world coordinate positions are known are arranged, at a plurality of positions and postures using the image sensing unit, and measured values of the sensor upon sensing the respective captured images;

detecting positions of the markers included in the respective captured images; and calculating the parameters using the measured values of the sensor, the detected marker positions, and the detected marker world coordinate positions, characterized by selecting captured images used upon calculating the parameters from the plurality of acquired captured images in accordance with a user's instruction.

In order to achieve the above object, for example, a program of the present invention comprises the following arrangement.

That is, a program for making a computer implement an information processing method for calculating parameters required to transform a position and posture of an image sensing unit measured by a sensor into a position and posture on a world coordinate system, characterized by comprising:

a program of a step of acquiring a plurality of captured images obtained by sensing images of a real space on which a plurality of markers whose world coordinate positions are known are arranged, at a plurality of positions and postures using the image sensing unit, and measured values of the sensor upon sensing the respective captured images;

a program of a step of detecting positions of the markers included in the respective captured images;

a program of a step of calculating the parameters using the measured values of the sensor, the detected marker positions, and the detected marker world coordinate positions; and a program of a step of selecting captured images used upon calculating the parameters from the plurality of acquired captured images in accordance with a user's instruction.

In order to achieve the above object, for example, an information processing apparatus of the present invention comprises the following arrangement.

That is, an information processing apparatus for calculating parameters required to transform a position and posture of an image sensing unit measured by a sensor into a position and posture on a world coordinate system, characterized by comprising:

an image sensing unit for sensing images of a real space on which a plurality of markers whose world coordinate positions are known are arranged;

a sensor for measuring a position and posture of the image sensing unit;

input unit adapted to input a plurality of captured images obtained by sensing the images of the real space on which the plurality of markers whose world coordinate positions are known are arranged, at a plurality of positions and postures using the image sensing unit, and measured values of the sensor upon sensing the respective captured images;

detection unit adapted to detect positions of the markers included in the respective captured images;

selection unit adapted to select captured images used upon calculating the parameters from the plurality of acquired captured images in accordance with a user's instruction; and calculation unit adapted to calculate the parameters using the measured values of the sensor, the detected marker positions, and the detected marker world coordinate positions in the selected captured images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
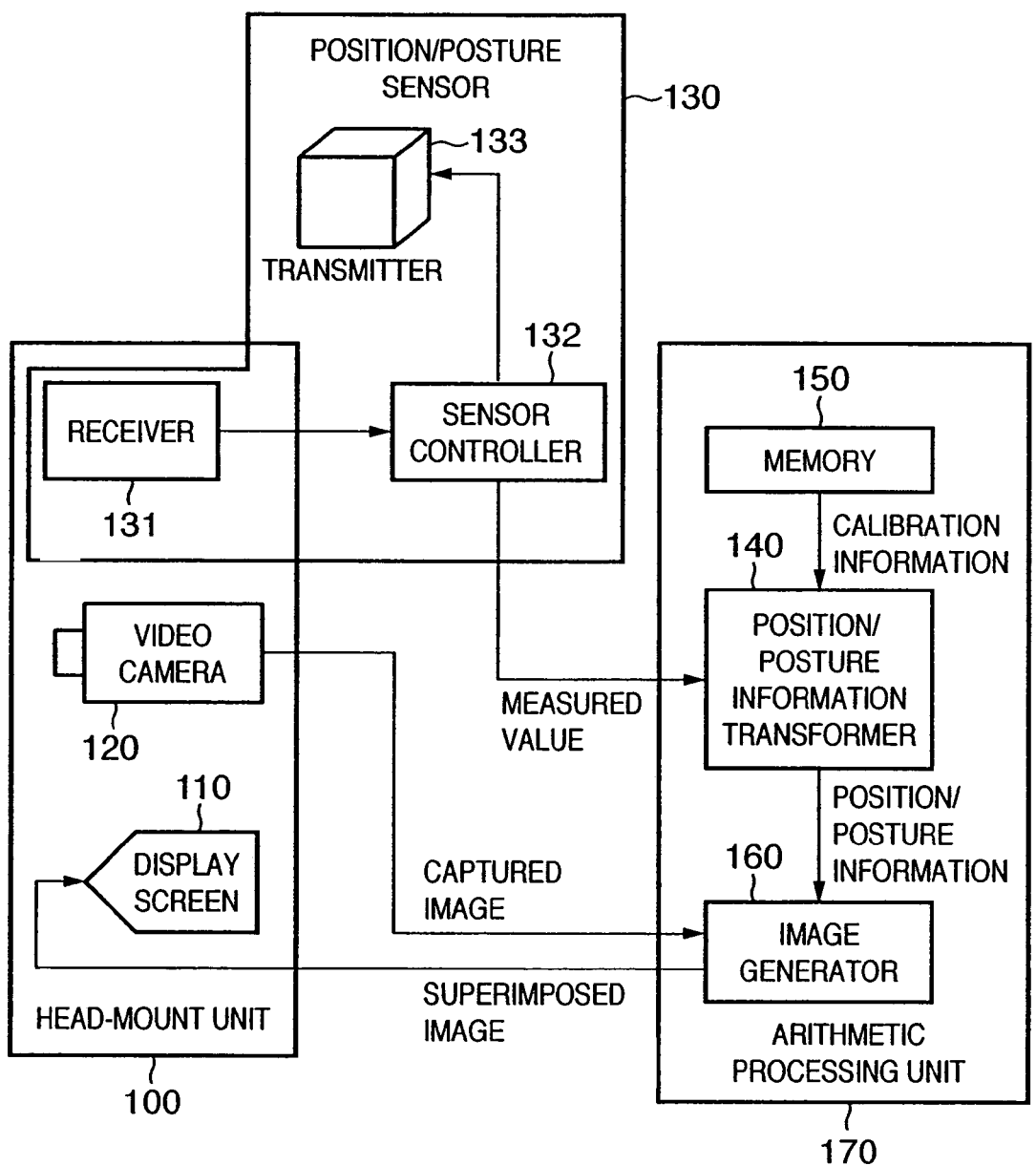
FIG. 1 is a block diagram showing the functional arrangement of a general image display apparatus which presents mixed reality.
Figure 2:
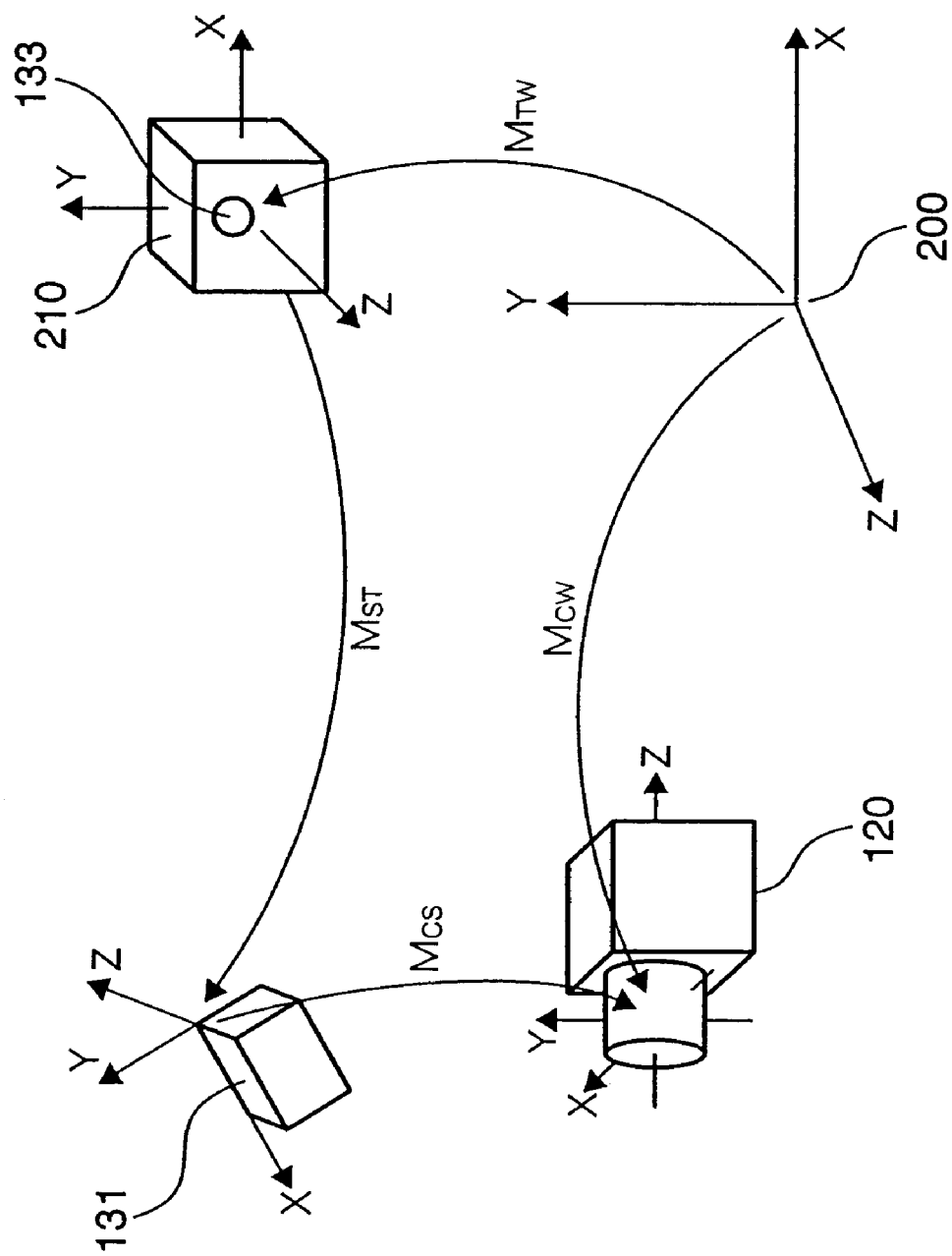
FIG. 2 is a view for explaining a method of calculating the position and posture of a video camera on a world coordinate system.

The embodiments to be described hereinafter will explain a case wherein the calibration apparatus and method of the present invention are applied to calibration of the image display apparatus shown in FIG. 1.

First Embodiment

In order to calibrate the image display apparatus using the calibration apparatus of this embodiment, at least three points of landmarks (feature points), which are known to the world coordinate system, must be arranged in a real space as a display target of the image display apparatus. Assume that the landmarks have, e.g., different colors, so that the image coordinate positions of their images projected onto a captured image can be detected, and these landmarks can be identified from each other. The world coordinate system has a predetermined point as an origin, and specifies x-, y-, and z-axes in orthogonal directions from this origin. Also, assume that the coordinate positions of the three points of landmarks are known on this coordinate system. That is, the distances to the three points of landmarks in the x-, y-, and z-directions from the origin are measured in advance.

Figure 3:
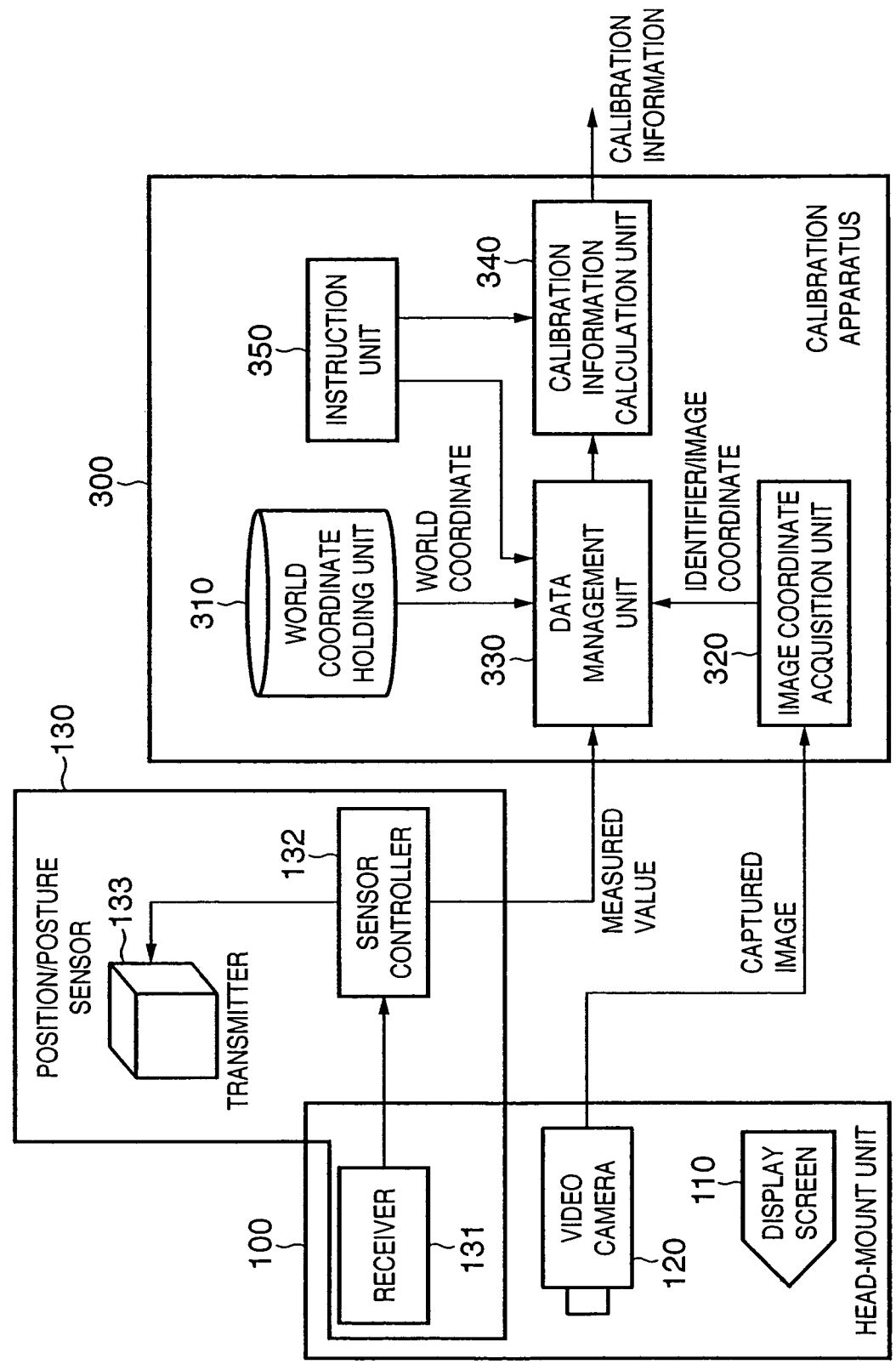
FIG. 3 is a block diagram showing the functional arrangement of a calibration information generation system which includes a calibration apparatus according to the first embodiment of the present invention.

FIG. 3 is a block diagram showing the functional arrangement of a calibration information generation system including the calibration apparatus of this embodiment. As shown in FIG. 3, a calibration apparatus 300 of this embodiment comprises a world coordinate holding unit 310, image coordinate acquisition unit 320, data management unit 330, calibration information calculation unit 340, and instruction unit 350. A head-mount unit 100 and position/posture sensor 130 of the image display apparatus to be calibrated are connected to the calibration apparatus 300.

The world coordinate holding unit 310 holds coordinate data (data measured in advance by the above method or the like) of the respective landmarks on the world coordinate system, and outputs these data in accordance with a request from the data management unit 330. Also, the world coordinate holding unit 310 holds information (landmark color, identification number) unique to each landmark in association with the coordinate data of the landmarks.

In accordance with a request from data management unit 330, the image coordinate acquisition unit 320 receives an image captured by a video camera 120, specifies the image coordinate position and identification number (identifier) of (a) landmark(s) which appear(s) in that image, and outputs such information to the data management unit 330. As a method of specifying the coordinate position and identification number of a landmark in an image, a region having a color of each landmark is extracted from an image with reference to the color information of the landmarks held by the world coordinate holding unit 310, and the barycentric position in the extracted region is obtained. In this way, the coordinate position of each landmark in the image can be obtained. Furthermore, an identification number corresponding to the color of each region is specified with reference to the identification number information of each landmark color held by the world coordinate holding unit 310. As a result, the landmark itself and its position in the image can be specified.

Upon receiving a "data acquisition" instruction from the instruction unit 350, the data management unit 330 receives the image coordinate position and identification number of a given landmark from the image coordinate acquisition unit 320, receives the world coordinate position of the corresponding landmark from the world coordinate holding unit 310, receives a sensor measurement value at the same time with a captured image from the position/posture sensor 130, adds a set of [world coordinate-sensor measurement value-image coordinate.] in a data list, and holds that list. Also, the data management unit 330 outputs the generated data list to the calibration information calculation unit 340 in accordance with a request from the calibration information calculation unit 340.

Upon reception of a "calibration information calculation" instruction from the instruction unit 350, the calibration information calculation unit 340 receives the data list from the data management unit 350, calculates calibration information based on the data list, and outputs the calculated calibration information.

The instruction unit 350 sends the "data acquisition" instruction to the data management unit 330 when the operator (not shown) inputs a data acquisition command, and the "calibration information calculation" instruction to the calibration information calculation unit 340 when the operator inputs a calibration information calculation command. The operator can input a command to the instruction unit 350 by pressing a key assigned a specific command using, e.g., a keyboard. Also, a command may be input on a GUI displayed on a display. That is, the command input method is not particularly limited.

Figure 4:
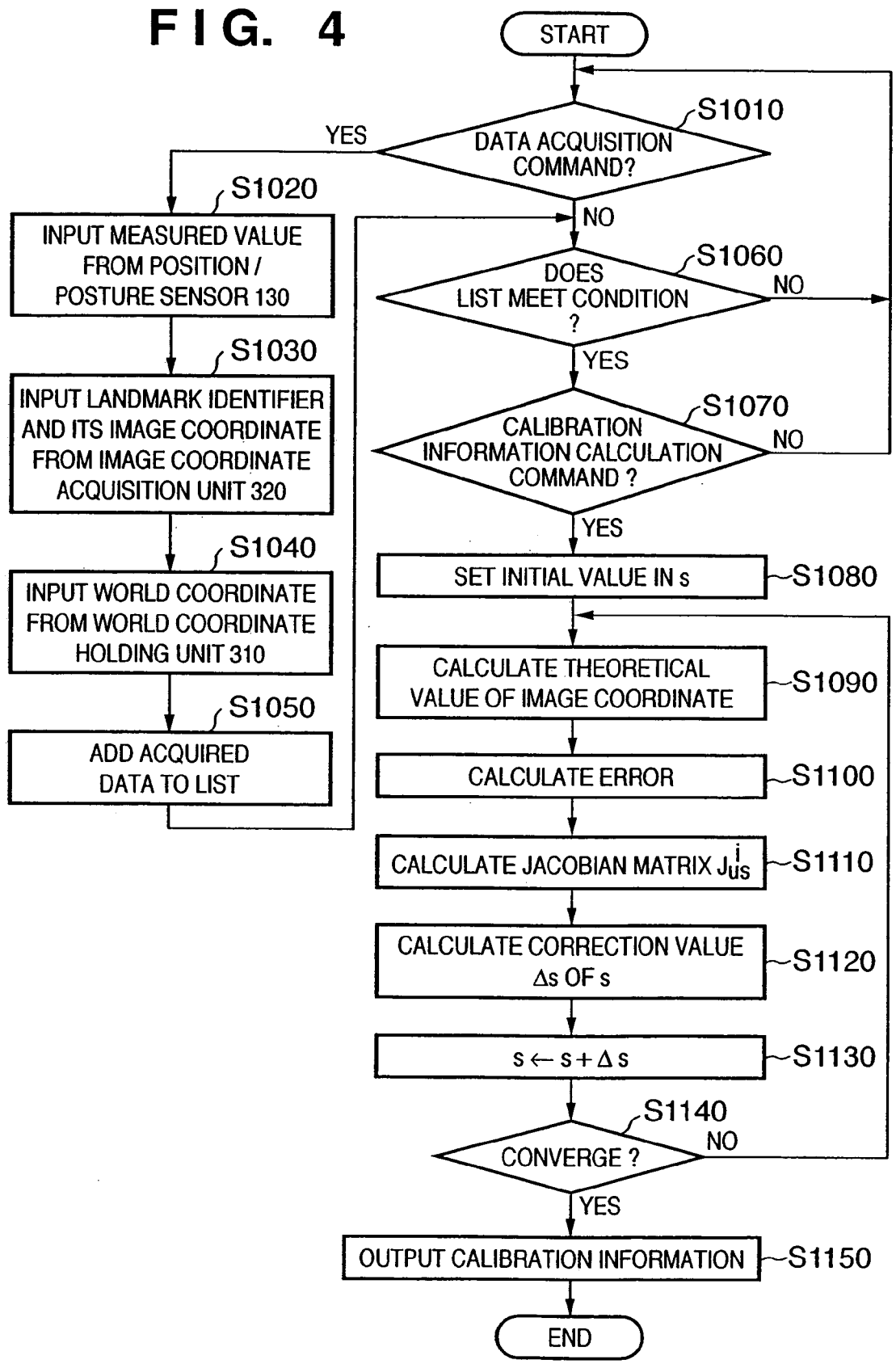
FIG. 4 is a flow chart of processes executed by the calibration apparatus of the first embodiment of the present invention upon calculating calibration information.

FIG. 4 is a flow chart showing processes of the calibration apparatus of this embodiment upon calculating calibration information. Note that a program code according to this flow chart is stored in a memory such as a RAM, ROM, or the like (not shown) in the apparatus of this embodiment, and is read out and executed by a CPU (not shown).

The instruction unit 350 determines in step S1010 whether or not the operator has input a data acquisition command. If the data acquisition command has been input, the flow advances to step S1020. In the following description, let $V_j$ be the viewpoint position where the video camera 120 is located at the input timing of the data acquisition command.

In step S1020, the data management unit 330 receives, from the position/posture sensor 130 (sensor controller 132), measurement value $M^{Vj}_{ST}$ obtained when the video camera 120 is located at viewpoint position $V_j$.

In step S1030, the data management unit 330 receives, from the image coordinate acquisition unit 320, identification number k and image coordinate position $u^{VjQk}$ of landmark $Q_k$ (k=1, 2, 3, . . . ) on an image captured by the video camera 120 located at viewpoint position $V_j$. If a plurality of landmarks appear in the captured image, this input is repeated for respective landmarks.

In step S1040, the data management unit 330 receives, from the world coordinate holding unit 310, world coordinate position $X^{Qk}_W$ of each landmark $Q_k$ (corresponding to identification number k) input from the image coordinate acquisition unit 320.

In step S1050, the data management unit 330 adds input data to data list $L_i$ for each detected landmark. More specifically, the image coordinate position of landmark $Q_k$ is given by $u^i = u^{VjQk} = [u^i_x, u^i_y]^T$, its world coordinate position is given by $X^i_W = X^{Qk}_W = [x^i_W, y^i_W, z^i_W, 1]^T$, and the sensor output at that time is given by $M^i_{ST} = M^{Vj}_{ST}$. Then, a set of $[u^i, X^i_W, M^i_{ST}]$ is registered in the list as the i-th data. Note that i indicates a value obtained by adding 1 to the total number of data currently registered in the list.

With the above process, data acquisition is made.

The instruction unit 350 checks in step S1060 if the data list acquired so far has information that suffices to calculate calibration information. If the data list does not meet a given condition, the flow returns to step S1010 to wait for input of the next data acquisition command. On the other hand, if the data list meets a calibration information calculation condition, the flow advances to step S1070. The calibration information calculation condition may include, for example, that data associated with three or more points of different landmarks be acquired, data be acquired at a plurality of viewpoint positions, and the total number of data be 6 or more. However, since the precision of calculated calibration information improves with increasing variety of input data, a condition that requires more data may be set.

It is checked in step S1070 if the operator has input a calibration information calculation command. If the calibration information calculation command has been input, the flow advances to step S1080; otherwise, the flow returns to step S1010 to wait for input of the next data acquisition command.

The calibration information calculation unit 340 internally expresses information that pertains to the posture of the calibration information to be calculated using a three-valued vector, which defines a rotation angle by the magnitude of the vector, and defines the direction of a rotation axis by the direction of the vector. $M_{CS}$ is expressed by the position $(x_{CS}, Y_{CS}, Z_{CS})$ and posture $(\xi_{CS}, \psi_{CS}, \zeta_{CS})$ of the receiver 131 on the coordinate system defined by the video camera 120, and $M_{TW}$ is expressed by the position $(x_{TW}, y_{TW}, z_{TW})$ and posture $(\xi_{TW}, \psi_{TW}, \zeta_{TW})$ of the world coordinate system 200 on the sensor coordinate system 210. Twelve unknown parameters are expressed by vector $s = [x_{CS}\ y_{CS}\ z_{CS}\ \xi_{CS}\ \psi_{CS}\ \zeta_{CS}\ x_{TW}\ y_{TW}\ z_{TW}\ \xi_{TW}\ \psi_{TW}\ \zeta_{TW}]$.

In step S1080, the calibration information calculation unit 340 gives an appropriate initial value (e.g., $s = [0\ 0\ 0\ 2/\pi\ 0\ 0\ 0\ 0\ 0\ 2/\pi\ 0\ 0]^T$) to vector s.

In step S1090, the calibration information calculation unit 340 calculates a theoretical value $u'^i = [u'^i_x, u'^i_y]^T$ of the image coordinate position of a given landmark for respective data $L_i$ (i=1, 2, ..., N) in the list on the basis of sensor output $M^i_{ST}$, world coordinate position $X^i_W$, and current s. Note that the theoretical value of the image coordinate position of the landmark indicates data of the position (coordinates) where the landmark is to appear in the image, which position is calculated from the obtained sensor output and the world coordinate position of the landmark. $u'^i$ can be obtained by a function:

$$u'^i = F^i(s) \tag{B}$$

which is defined by sensor output $M^i_{ST}$ and world coordinate position $X^i_W$ using s as a parameter.

More specifically, viewing transformation matrix $M_{CS}$ is calculated from $(x_{CS}, y_{CS}, z_{CS})$ and $(\xi_{CS}, \psi_{CS}, \zeta_{CS})$ as elements of s, and viewing transformation matrix $M_{TW}$ is similarly calculated from $(x_{TW}, y_{TW}, z_{TW})$ and $(\xi_{TW}, \psi_{TW}, \zeta_{TW})$ on the basis of:

$$M(x,y,z,\xi,\psi,\zeta) = \begin{bmatrix} 1 & 0 & 0 & x \\ 0 & 1 & 0 & y \\ 0 & 0 & 1 & z \\ 0 & 0 & 0 & 1 \end{bmatrix} \cdot \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta & 0 \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta & 0 \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta & 0 \\ 0 & 0 & 0 & 1 \end{bmatrix} \tag{C}$$

(for $\theta = \sqrt{\xi^2+\psi^2+\zeta^2}$)

Then, camera coordinate position $X^i_C$ of that landmark is calculated by:

$$X^i_C = [x^i_C\ y^i_C\ z^i_C\ 1]^T = M_{CS} \cdot M^i_{ST} \cdot M_{TW} \cdot X^i_W \tag{D}$$

Finally, the theoretical value of the image coordinate position is calculated by:

$$u'^i_x = -f \times x^i_C / z^i_C,\ u'^i_y = -f \times y^i_C / z^i_C \tag{E}$$

where f is the focal length of the video camera 120.

In step S1100, the calibration information calculation unit 340 calculates error $\Delta u^i$ between theoretical value $u'^i$ and measured value $u^i$ of the image coordinate position of the corresponding landmark for each data $L_i$ in the list by:

$$\Delta u^i = u^i - u'^i \tag{F}$$

In step S1110, the calibration information calculation unit 340 calculates Jacobian matrix $J^i_{us}$ ($= \partial u/\partial s$) of 2 rows×12 columns, which has, as elements, solutions obtained by partially differentiating the right-hand side of equation (B) by respective elements of vector s for each data $L_i$ in the list. More specifically, the unit 340 calculates, on the basis of equations (E) and (D), Jacobian matrix $J^i_{ux}$ ($= \partial u/\partial x$) of 2 rows×3 columns, which has, as elements, solutions obtained by partially differentiating the right-hand side of equation (E) by respective elements of camera coordinate position $X^i_C$, and Jacobian matrix $J^i_{xs}$ ($= \partial x/\partial s$) of 3 rows×12 columns, which has, as elements, solutions obtained by partially differentiating the right-hand side of equation (D) by respective elements of vector s, and then calculates them as:

$$J^i_{us} = J^i_{ux} \cdot J^i_{xs} \tag{G}$$

In step S1120, the calibration information calculation unit 340 calculates correction value $\Delta s$ of s on the basis of errors $\Delta u^i$ and Jacobian matrices $J^i_{us}$ calculated for all data $L_i$ in the list calculated in steps S1100 and S1110. More specifically, the unit 340 generates vectors $U=[\Delta u^1 \; \Delta u^2 \; \ldots \; \Delta u^N]^T$ and $\Phi=[J^1_{us} \; J^2_{us} \; \ldots \; J^N_{us}]^T$ by vertically arranging errors $\Delta u^i$ and Jacobian matrices $J^i_{us}$ calculated for all data, and calculates them using a generalized inverse matrix of $\Phi$ as:

$$\Delta s = (\Phi^T \Phi)^{-1} \Phi^T U \quad \text{(H)}$$

In step S1130, the calibration information calculation unit 340 corrects s using correction value $\Delta s$ calculated in step S1120 by $$s + \Delta s \rightarrow s \quad \text{(I)}$$

The calibration information calculation unit 340 determined in step S1140 whether or not the calculation converges, using some criteria, e.g., by seeing if elements of U are sufficiently small or if $\Delta s$ is sufficiently small. If the calculation does not converge, processes in step S1090 and subsequent steps are repeated using corrected s.

In step S1150, the calibration information calculation unit 340 outputs obtained s as calibration information. As the calibration information, for example, two viewing transformation matrices calculated from s are output. The output form may be s itself, or information described by any other position/posture description methods may be output.

Note that the world coordinate holding unit 310, image coordinate acquisition unit 320, data management unit 330, calibration information calculation unit 340, and instruction unit 350 can be implemented by, e.g., a single versatile computer.

<Modification 1>

In this embodiment, the aforementioned calibration apparatus and method are applied to calibration of the image display apparatus which uses the magnetic sensor FASTRAK available from Polhemus as the position/posture sensor 130. However, the position/posture sensor 130 that can be calibrated by the calibration apparatus and method of this embodiment is not limited to the FASTRAK. That is, the calibration apparatus and method of this embodiment can calibrate image display apparatuses that use any other position/posture sensors (e.g., Flock of Birds available from Ascension Technology, OPTOTRAK available from Northern Digital Inc., and the like) in measurement of the position and posture.

<Modification 2>

In the above embodiment, the image coordinate position and identification number of each landmark are acquired using a landmark which has a specific color as identification information by extracting a specific color region from an image by a threshold value process, and detecting the barycentric position of that region as the image coordinate position of the landmark having that color. However, any other methods may be used as long as they can specify the projection coordinate position of a landmark on an image and its identification number. For example, using a landmark which has a specific pattern as identification information, a region of the specific pattern may be extracted from an image by pattern matching, and its detection position may be output as the image coordinate position of the landmark having that pattern. Also, such detection process need not always be implemented by an image process, and the operator may manually input the image coordinate position and identification number of a landmark. In this case, the image coordinate acquisition unit 320 preferably has an arbitrary GUI that allows the operator to easily input a landmark position by, e.g., designating a landmark position on a captured image displayed on a work display by clicking a mouse button.

When a plurality of landmarks which have identical features that cannot be identified by an image process are used, the image coordinate position of each landmark may be acquired by the image process, and its identification number may be manually input. The landmark may be identified by any other methods. For example, when approximate calibration information is obtained in advance, the landmark may be identified by comparing the theoretical value of the image coordinate position of each landmark calculated by equation (B) with the image coordinate position of the detected landmark.

In either of the acquisition process using the image process or manual acquisition, the landmark need not always be an artificial (man-made) one, but may use a natural feature.

<Modification 3>

In the above embodiment, an appropriate value is set as the initial value of the calibration information in step S1080. However, if the initial value is considerably different from an actual value, the solution cannot converge and calibration information cannot be calculated in the above embodiment. To cope with such situation, combinations of different positions/postures may be set in advance, the processes in steps S1090 to S1140 may be executed using these combinations in turn as the initial value, and s upon convergence of the solution may be selected. Also, an initial value input unit at which the operator inputs initial values (or information of the position and posture required to generate initial values) may be prepared, and a calibration information calculation process may be executed using the input initial values.

<Modification 4>

In a preferred modification of the present invention, the calibration apparatus further has an image generation unit. The image generation unit superimposes the image coordinate position of the landmark detected by the image coordinate acquisition unit 320 on a captured image and outputs to the display screen. According to this modification, the operator can input a data acquisition instruction while confirming the landmark detection state.

The image generation unit calculates the theoretical value of the image coordinate position of each landmark on the basis of the calibration information calculated by the calibration information calculation unit 340, and superimposes the calculated value on the captured image and outputs to the display screen. According to this modification, the operator can verify the calibration process result by comparing an actual landmark and the calculated position displayed there.

<Modification 5>

In the above embodiment, the apparatus has the instruction unit 350 used to input a control command by an operator. However, this input is not always necessary. For example, every time the image coordinate acquisition unit 320 detects a landmark, data may be added to the data list, and when the data list meets a given condition, the calibration information calculation unit 340 may calculate calibration information.

<Modification 6>

In the above embodiment, the calibration apparatus is independent from the image display apparatus. Of course, an image display apparatus may be designed to have the function of the calibration apparatus.

<Modification 7>

In the above embodiment, the position/posture sensor of the image display apparatus that presents mixed reality is calibrated. However, the present invention is not limited to such specific application range, and may be applied to any other applications that measure the position and posture of an image sensing device using a position/posture sensor.

As described above, according to the first embodiment, calibration information required to transform the position and posture of the image sensing device measured by the sensor into those on the world coordinate system can be easily acquired without using any special calibration tool.

Second Embodiment

A sensor calibration apparatus of this embodiment calculates parameters required to transform the position and posture of an image sensing unit measured by a sensor into those on the world coordinate system.

For this purpose, the sensor calibration apparatus of this embodiment calculates parameters using:

(1) the world coordinate positions of four or more markers which are not located on an identical line;

(2) the image coordinate positions of markers on images captured at a plurality of positions/postures;

(3) sensor measurement values upon capturing the images of (2); and (4) initial values (approximate values) of sensor layout information.

Of these data, (1) the world coordinate positions of the markers are data which must be prepared as known information in a preparation process of calibration. At least three points of markers (landmarks, feature points), which are known to the world coordinate positions, must be arranged in a real space as a display target of the image display apparatus. Assume that the markers have, e.g., different colors, so that the image coordinate positions of their images projected onto a captured image can be detected, and these markers can be identified from each other. The world coordinate system has a predetermined point as an origin, and specifies X-, Y-, and Z-axes in orthogonal directions from this origin. Also, assume that the coordinate positions of the three points of markers are known on this coordinate system. That is, the distances from the origin to the three points of markers in the X-, Y-, and Z-directions are measured in advance.

(2) and (3) mean data acquired upon calibration. The initial values of the sensor layout information (4) are not always required, but an appropriate solution cannot often be often if they are not set.

A theoretical value of the image coordinate position of each marker is calculated on the basis of the world coordinate position of that marker, sensor measurement value, and sensor layout information using these data as inputs, and calibration information (parameters) that can minimize the sum of errors from actually measured values is calculated.

Note that parameters may be calculated using other methods that use other kinds of information.

Figure 5:
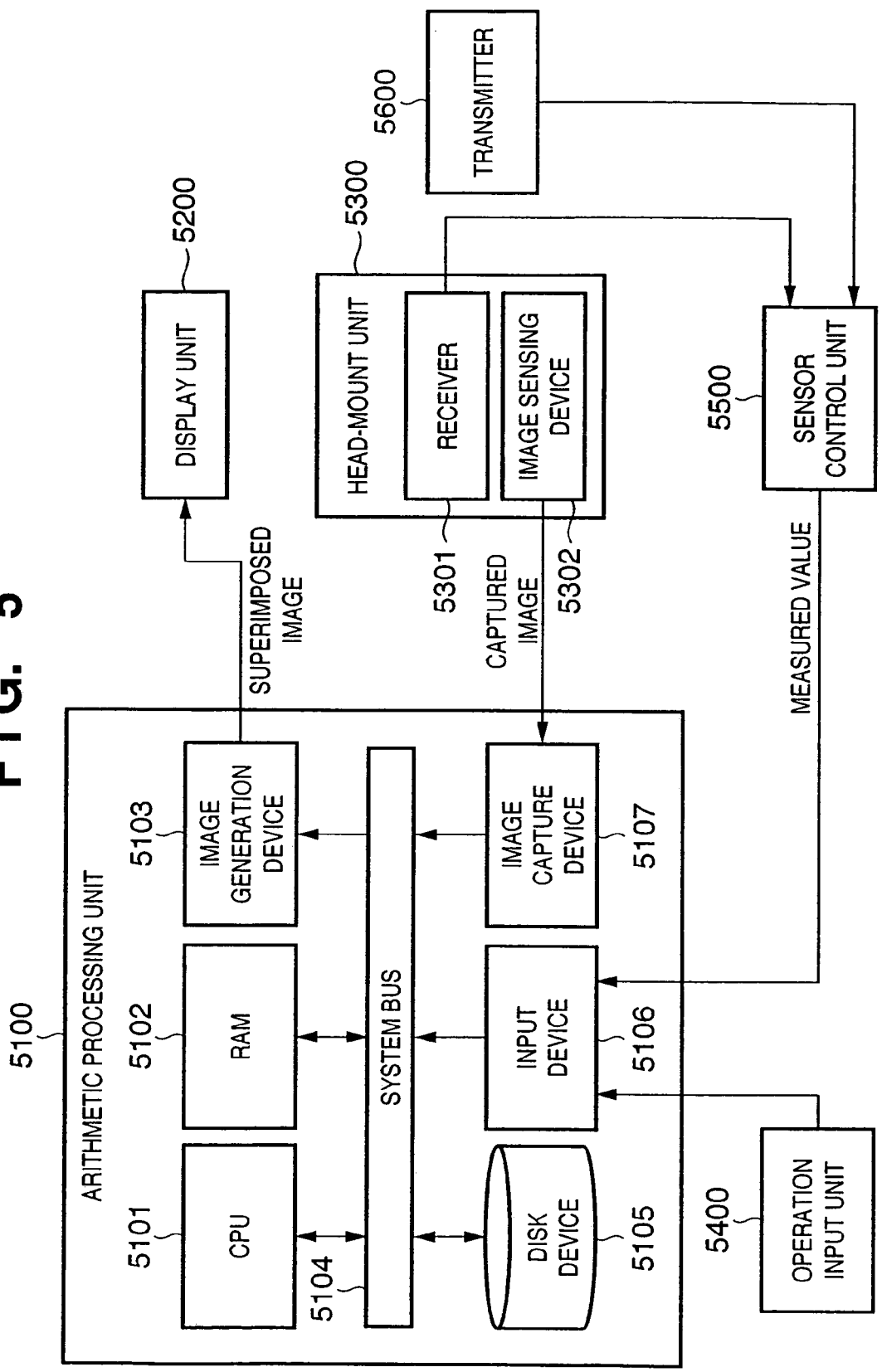
FIG. 5 is a schematic block diagram for explaining the arrangement of a calibration apparatus according to the second embodiment of the present invention.

FIG. 5 is a schematic block diagram of the sensor calibration apparatus of this embodiment.

Referring to FIG. 5, reference numeral 5100 denotes an arithmetic processing unit which comprises a computer or the like. The arithmetic processing unit 5100 includes a CPU 5101, RAM 5102, image generation device 5103, system bus 5104, disk device 5105, input device 5106, and image capture device 5107.

The CPU 5101 controls a calibration process on the basis of a calibration program. The CPU 5101 is connected to the system bus 5104, and can communicate with the RAM 5102, image generation device 5103, disk device 5105, input device 5106, and image capture device 5107.

The RAM 5102 is implemented by a main storage device such as a memory or the like. The RAM 5102 temporarily holds a program code of the calibration program, program control information, the world and image coordinate positions of the markers, calibration information calculated by this apparatus, and the like via the system bus 5104.

The image generation device 5103 is implemented by a device such as a graphics card or the like. The image generation device 5103 outputs image information generated by a program which is executed by the CPU 5101 to a display unit 5200 via the system bus 5104.

The system bus 5104 serves as a communication path to which respective devices which form the arithmetic processing unit 5100 are connected to communicate with each other.

The disk device 5105 is implemented by an auxiliary storage device such as a hard disk or the like. The disk device 5105 holds the program code of the calibration program, the program control information, the world and image coordinate positions of the markers, the calibration information calculated by this apparatus, and the like.

The input device 5106 is implemented by various interface devices. The input device 5106 receives signals from devices externally connected to the arithmetic processing unit 5100 as data, and writes the data in the RAM 5102 via the system bus 5104.

The image capture device 5107 is implemented by a device such as a capture card or the like. The image capture device 5107 receives an image output from an image sensing device 5302, and writes image data in the RAM 5102 via the system bus 5104.

Reference numeral 5200 denotes a display unit which is implemented by a display device such as a CRT monitor, liquid crystal monitor, or the like. The display unit 5200 is used to display a video signal output from the image generation device 5103, and to present the result to the user of this apparatus.

Reference numeral 5300 denotes a head-mount unit, which is to be calibrated by this apparatus. The head-mount unit 5300 comprises a receiver 5301 and the image sensing device 5302.

The receiver 5301 is implemented by a device for measuring a magnetic field generated by a transmitter 5600 in, e.g., a magnetic sensor. The magnetic field value measured by the receiver 5301 is output to a sensor control unit 5500, which converts the measured value into parameters that represent a 3D position and posture.

The image sensing device 5302 is implemented by an image sensing device such as a CCD camera or the like. A video signal sensed by the image sensing device 5302 is sent to the image capture device 5107.

An operation input unit 5400 is implemented by input devices such as a keyboard, mouse, and the like, which are used to control the arithmetic processing unit 5100. The operation input unit 5400 outputs an operation signal to the input device 5106. The user (not shown) of this apparatus gives a control instruction of this apparatus by operating the operation input unit 5400.

The sensor control unit 5500 controls the receiver 5301 and transmitter 5500 in, e.g., a magnetic sensor, and calculates the 3D position and posture information of the receiver 5301 on the basis of information received from the receiver 5301. The 3D position and posture information calculated by the sensor control unit 5500 are sent to the input device 5106.

The transmitter 5600 generates a magnetic field to make the sensor control unit 5500 calculate the 3D position and posture of the receiver 5301 in, e.g., the magnetic sensor.

In this embodiment, the magnetic sensor is used. However, the sensor to be used is not limited to the magnetic sensor. For example, an optical sensor, ultrasonic wave sensor, or the like may be used, and the types of sensors are not particularly limited as long as they can measure the 3D position and posture. In this case, the receiver 5301 serves as an object to be measured by the sensor, and the transmitter 5600 serves as the origin of a sensor coordinate system when the sensor control unit 5500 calculates the 3D position and posture of the receiver 5301.

Figure 6:
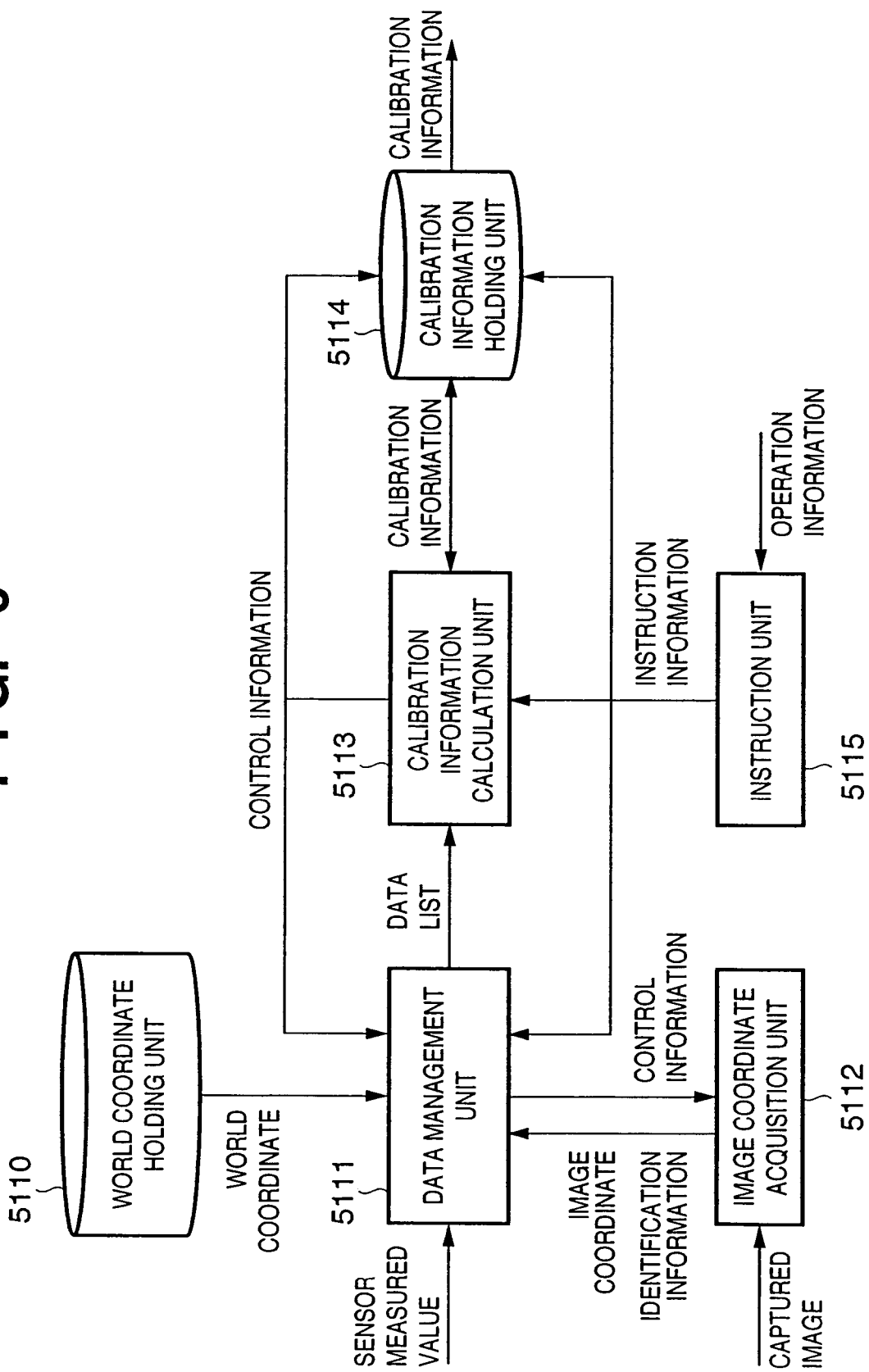
FIG. 6 is a block diagram for explaining the functional arrangement of the calibration apparatus according to the second embodiment of the present invention.

FIG. 6 is a block diagram showing the functional arrangement of the calibration apparatus of this embodiment. Processes of respective units in FIG. 6 are executed inside the arithmetic processing unit 5100 shown in FIG. 5.

A world coordinate holding unit 5110 holds coordinate data of the respective markers on the world coordinate system, and outputs these data in accordance with a request from a data management unit 5111. Also, the world coordinate holding unit 5110 holds (marker color information, identification information) data of unique information to each marker in association with the coordinate data of the markers.

Upon receiving a data acquisition request from an instruction unit 5115, the data management unit 5111 receives the image coordinate position and identification information of a given marker from an image coordinate acquisition unit 5112, receives the world coordinate position of the marker corresponding to the identification information from the world coordinate holding unit 5110, adds a set of the image coordinate position, world coordinate position, and identification information in a data list, and holds that list. If the data management unit 5111 receives the image coordinate position of a given marker alone from the image coordinate acquisition unit 5112 but does not receive any identification information, only the image coordinate position is added to the data list. Upon receiving a data delete request from the instruction unit 5115, the data management unit 5111 deletes data from the data list. Furthermore, upon receiving a data identification request from the instruction unit 5115, the data management unit 5111 changes data in the data list by changing the combinations of world coordinate positions, image coordinate positions, and identification information of markers. Moreover, the data management unit 5111 outputs the generated data list to a calibration information calculation unit 5113 in accordance with a request from the calibration information calculation unit 5113.

The image coordinate acquisition unit 5112 specifies the coordinate position and identification information of a marker which appears in an image (to be referred to as a real image hereinafter), which is sensed by the image sensing device 5302 (FIG. 5) and is captured by the image captured device 5107 (FIG. 5), and outputs such information to the data management unit 5111 in accordance with a request from the data management unit 5111.

Upon receiving a calibration information calculation instruction from the instruction unit 5115, the calibration information calculation unit 5113 receives the data list from the data management unit 5111, calculates calibration information based on the data list, and outputs the calculated calibration information to a calibration information holding unit 5114.

The calibration information holding unit 5114 holds the calibration information calculated by the calibration information calculation unit 5113, and outputs or changes the held calibration information, or saves the calibration information in a file in accordance with a request from the instruction unit 5115. Upon receiving an output request from the instruction unit 5115, the unit 5114 outputs the calibration information. Upon receiving a calibration information change request from the instruction unit 5115, the unit 5114 changes the value of the held calibration information. Upon receiving a file save request from the instruction unit 5115, the unit 5114 generates a file on the disk device 5105, and saves the calibration information in that file. Upon receiving a file load request from the instruction unit 5115, the unit 5114 discards the currently held calibration information, loads the designated file from the disk device 5105, and sets the loaded value as new current calibration information. Upon receiving a reset request from the instruction unit 5115, the unit 5114 discards the currently held calibration information, and sets a default value of calibration information held upon launching this apparatus as new current calibration information. Also, the calibration information holding unit 5114 outputs held calibration information to the calibration information calculation unit 5113 in accordance with a request from the calibration information calculation unit 5113. The calibration information output to the calibration information calculation unit 5113 is used as an initial value when the calibration information calculation unit 5113 calculates calibration information.

The instruction unit 5115 outputs a data acquisition request, data delete request, and data identification request to the data management unit 5111 in response to a data acquisition command, data delete command, and data identification command input from the user of this apparatus, respectively. Upon receiving a calibration information calculation command, the unit 5115 outputs a calibration information calculation request to the calibration information calculation unit 5113.

Figure 7:
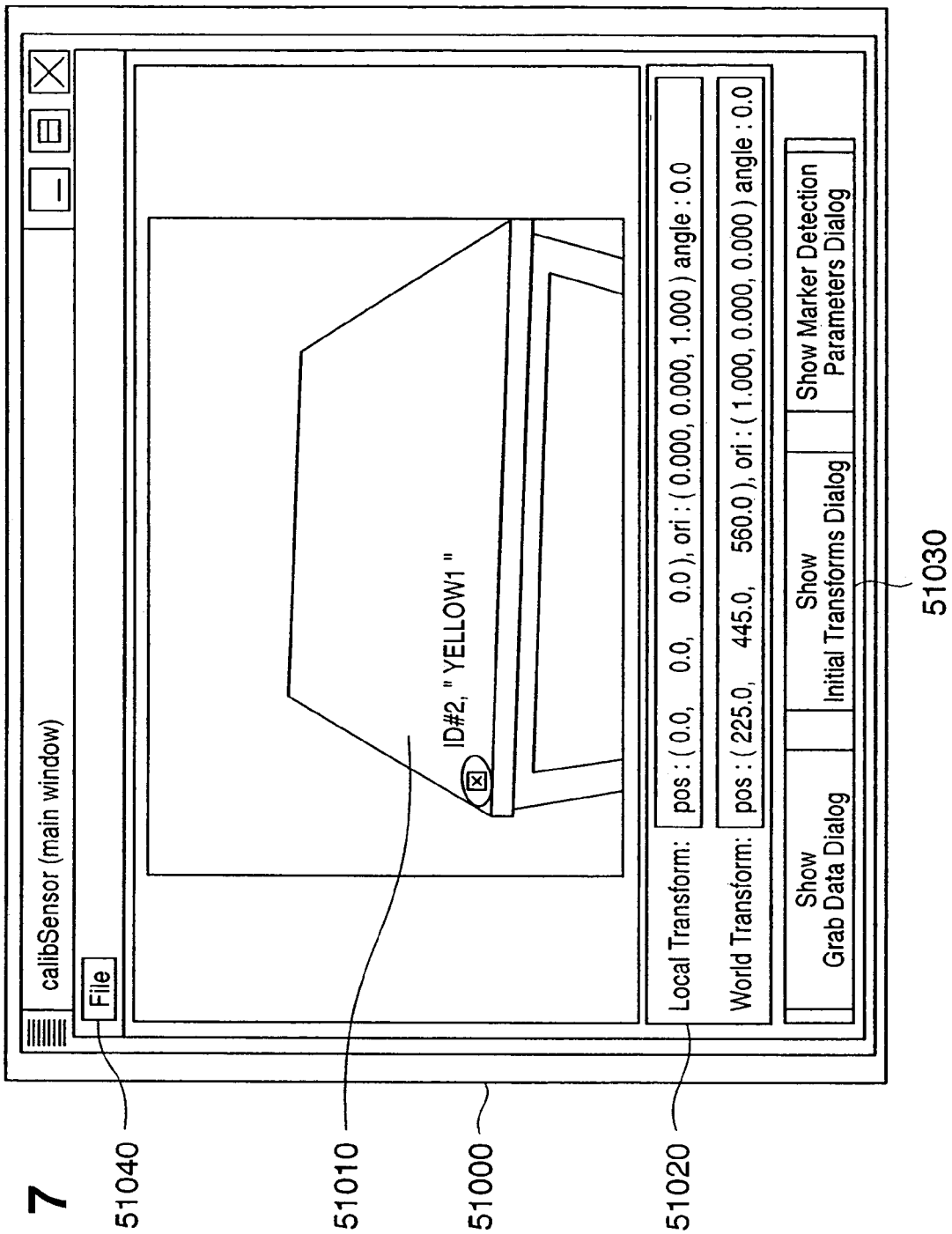
FIG. 7 is a view for explaining a GUI presented by the calibration apparatus according to the second embodiment.
Figure 8:
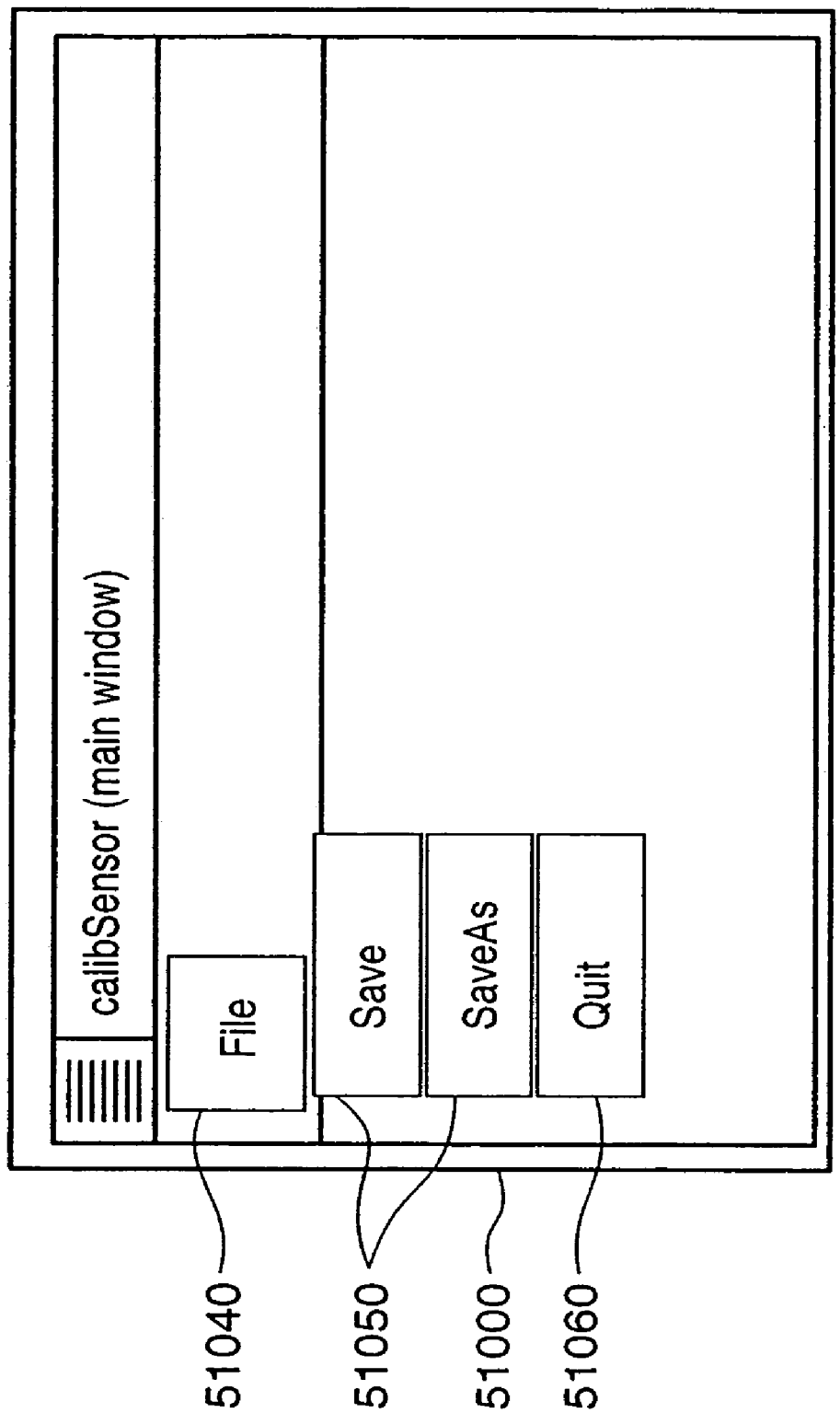
FIG. 8 is a view for explaining a file menu of the GUI presented by the calibration apparatus according to the second embodiment.

In this embodiment, the user of this apparatus gives an instruction to the instruction unit 5115 using a GUI shown in FIG. 7. The GUI shown in FIG. 7 is formed by a main window 51000, image display area 51010, calibration information display area 51020, operation buttons 51030, and file menu 51040. As shown in FIG. 8, the file menu 51040 includes a save sub-menu 51050, and quit sub-menu 51060.

On the image display area 51010, a real image is displayed. Also, a mark indicating the coordinate position of a marker specified by the image coordinate acquisition unit 5112, and its identification information are superimposed on the real image.

Figure 9:
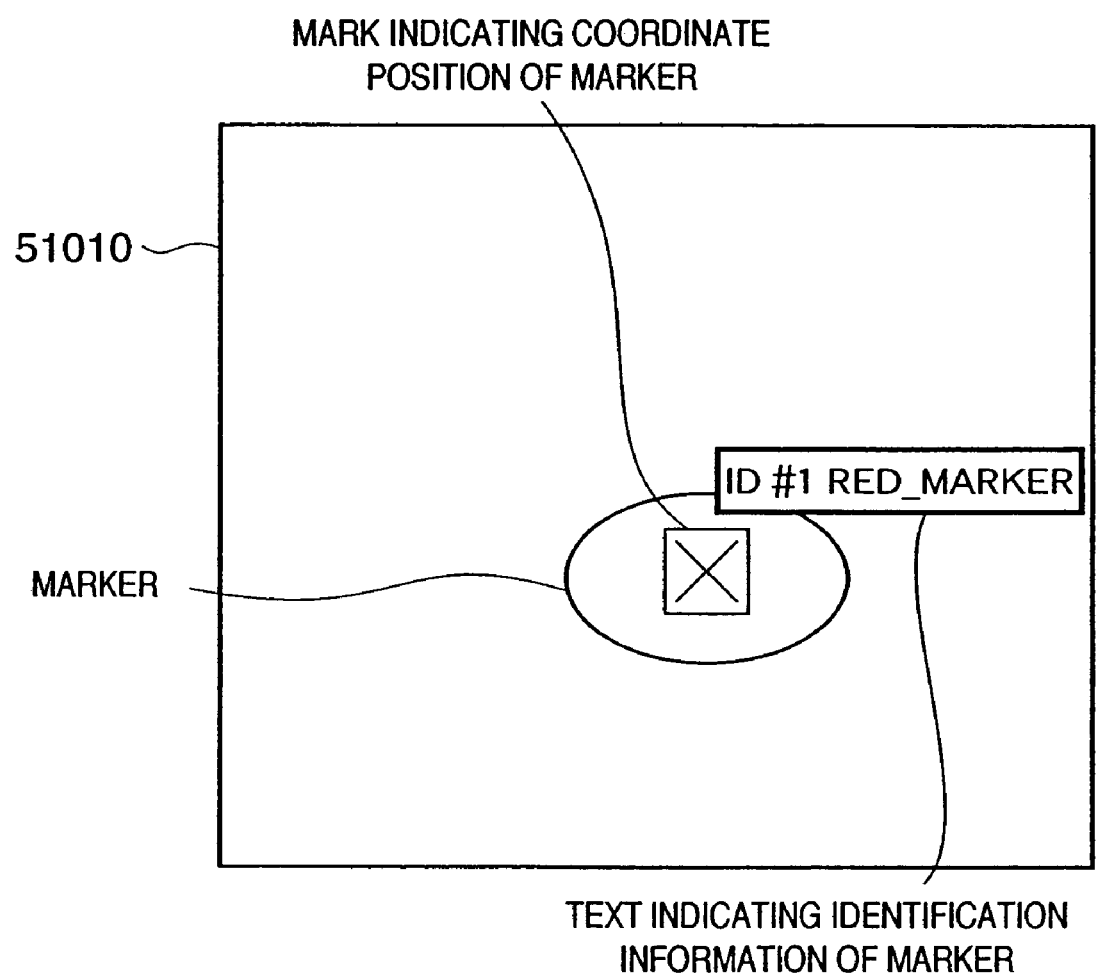
FIG. 9 is a view for explaining a state wherein a mark indicating the image coordinate position of a marker, and additional information are superimposed on a real image on the GUI presented by the calibration apparatus according to the second embodiment.

FIG. 9 shows a state wherein the mark which indicates the coordinate position of a marker specified by the image coordinate acquisition unit 5112, and its identification information are superimposed on the real image displayed on the image display area 51010. In FIG. 9, an ellipse indicates a marker which appears in the real image. Also, the image coordinate position of the marker specified by the image coordinate acquisition unit 5112 is indicated by a boxed mark X. Furthermore, text which indicates a marker name is superimposed in association with the identification information of the marker specified by the image coordinate acquisition unit 5112.

By superimposing the mark at the image coordinate position of the marker, the user of this apparatus can confirm the coordinate position specified by the image coordinate acquisition unit 5112 at a glance.

Also, by superimposing the identification information of the marker, the user of this apparatus can confirm, at a glance, the marker specified by the image coordinate acquisition unit 5112.

In this example, the boxed mark X is superimposed to indicate the image coordinate position of the marker. However, the mark to be superimposed is not limited to the boxed mark X. For example, various symbols such as arrows ○, X, □, and the like or icons and the like may be used, and any other marks may be used as long as the user can visually confirm the image coordinate position of the marker specified by the image coordinate acquisition unit 5112.

Also, text indicating the name is superimposed as the identification information of the marker. However, the identification information to be superimposed is not limited to text. For example, the user may identify the marker using an icon, image, or the like, or by changing the color of text, icon, image, or the like or that of the marker itself. That is, any other types of identification information may be used as long as the user of this apparatus can confirm correspondence between the marker which appears in the real image, and the actual marker.

Figure 10:
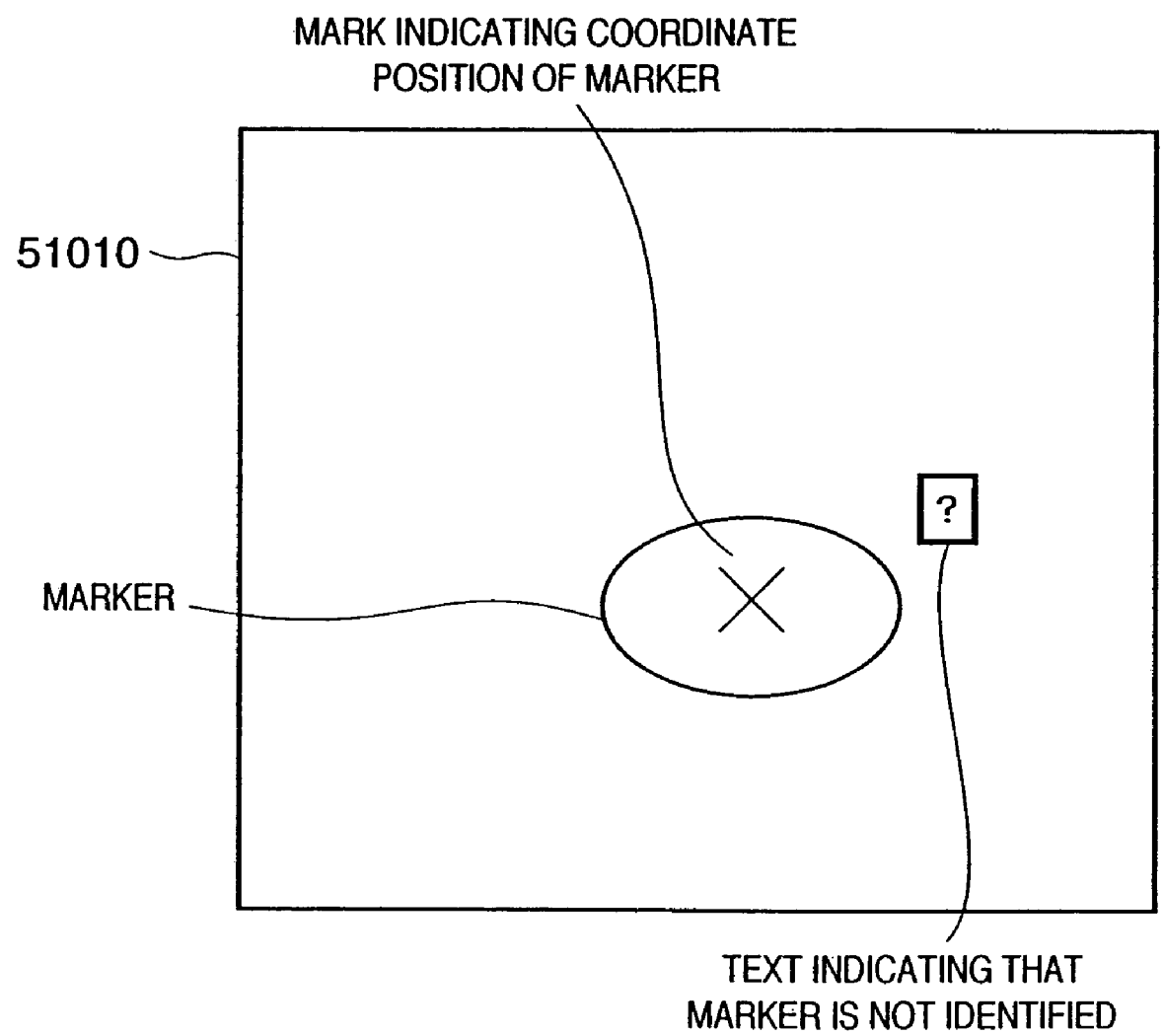
FIG. 10 is a view for explaining a state wherein the mark indicating the image coordinate position of the marker, and additional information are superimposed on a real image on the GUI presented by the calibration apparatus according to the second embodiment, when the marker is not identified.

FIG. 10 shows a display example on the image display area 51010 when the image coordinate acquisition unit 5112 specifies the image coordinate position of the marker, but cannot specify identification information, and the data management unit 5111 does not generate a set of the world coordinate position, image coordinate position, and identification information of the marker. In the following description, determining correspondence among the world coordinate position, image coordinate position, and identification information of the marker, and generating a set of these data by the data management unit 5111 will be expressed by "identifying a marker".

In FIG. 10, the mark X is superimposed on the real image at the image coordinate position of the marker. Also, text "?" is superimposed on the real image. When the marker has been identified, the boxed mark X and identification information of the marker are superimposed on the image display area 51010; when the marker has not been identified, the display method is switched.

The display method used depending on whether or not the marker has been identified need not be switched on the entire image display area 51010, but may be independently switched for each marker which appears on the image display area 51010.

Figure 11:
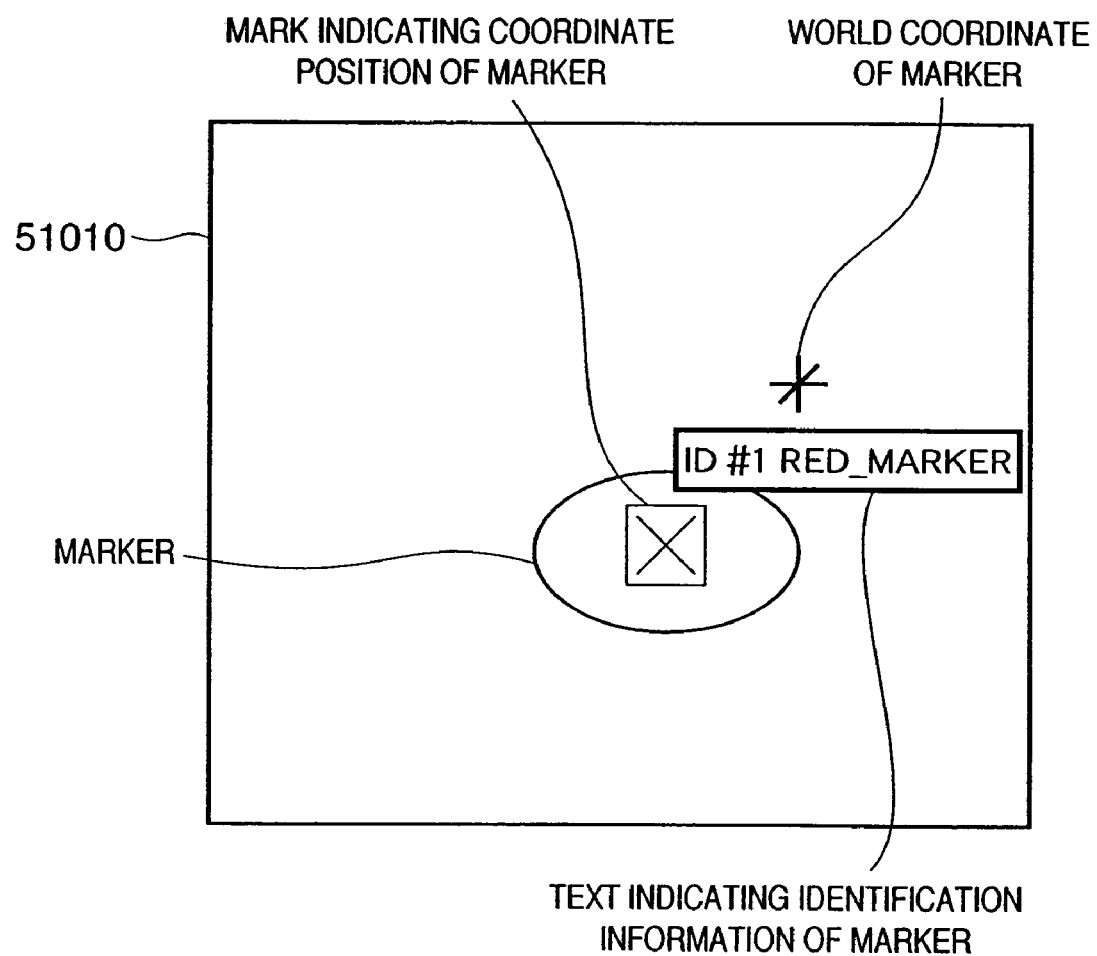
FIG. 11 is a view for explaining a state wherein the world coordinate position of the marker is rendered as CG, and is superimposed on a real image on the GUI presented by the calibration apparatus according to the second embodiment.

FIG. 11 shows a state wherein the coordinate position of the marker on the world coordinate system, which is held by the world coordinate holding unit 5110, is rendered by CG from the viewpoint of the image sensing device 5302, on the basis of the current calibration information and the position/posture information of the receiver 5301, and that CG image is superimposed on the real image displayed on the image display area 51010.

If calibration is correctly done by this apparatus, the coordinate position of the marker specified by the image coordinate acquisition unit 5112 theoretically matches the world coordinate position of that marker superimposed on the real image. The user of this apparatus can visually confirm the precision of calibration done by this apparatus by checking the deviation between the image and world coordinate positions of the marker.

In this embodiment, the world coordinate position of the marker is rendered by CG. However, an object to be rendered by CG is not limited to the world coordinate position of the marker.

For example, in order to allow the user to confirm the appearance of the world coordinate system on the real image, the coordinate axes, plane, world coordinate origin, and the like, which define the world coordinate system, may be rendered.

When some functions of this calibration apparatus are implemented using an image display apparatus that presents mixed reality, a virtual world and virtual object used upon presenting mixed reality may be rendered by CG.

When the image coordinate acquisition unit 5112 executes a process for extracting a color region from an image so as to specify the marker coordinate position, the image display area 51010 may display an image indicating result of the color region extraction process in place of the real image. In this way, the user of this apparatus can easily adjust parameters for the color region extraction process.

The user of this apparatus can designate the image coordinate position in the image display area 51010 using a pointing device such as a mouse or the like. For example, the user himself or herself of this apparatus can specify the coordinate position of a marker (in the real image), which is to be done by the image coordinate acquisition unit 5112. Also, the user of this apparatus can select a desired marker which appears in the real image, can change processing parameters for that marker, and can manually input identification information of the marker.

The calibration information display area 51020 displays the current calibration information held by the calibration information holding unit 5114.

The operation buttons 51030 are used to control the behavior of this apparatus and GUI when the user of this apparatus selects each button region using a pointing device such as a mouse or the like. In this embodiment, when the user of this apparatus selects one of the operation buttons 51030, a data acquisition dialog, initial value setting dialog, or detection parameter setting dialog is newly displayed.

The file menu 51040 displays the save sub-menu 51050 and quit sub-menu 5160 when the user of this apparatus selects a menu region using a pointing device such as a mouse or the like.

The save sub-menu 51050 gives an instruction to this apparatus when the user of this apparatus selects a sub-menu region using a pointing device such as a mouse or the like. Upon selection of the save sub-menu 51050, the instruction unit 5115 issues a file save command, and outputs a file save request to the calibration information holding unit 5114.

The quit sub-menu 51060 gives an instruction to this apparatus when the user of this apparatus selects a sub-menu region using a pointing device such as a mouse or the like. Upon selection of the quit sub-menu 51060, this calibration apparatus quits. When the calibration information holding unit 5114 holds calibration information which is not saved yet, the instruction unit 5115 issues a file save command, and outputs a file save request to the calibration information holding unit 5114. The instruction unit 5115 waits until the calibration information holding unit 5114 completes a file save process, and then quits this calibration apparatus.

Figure 12:
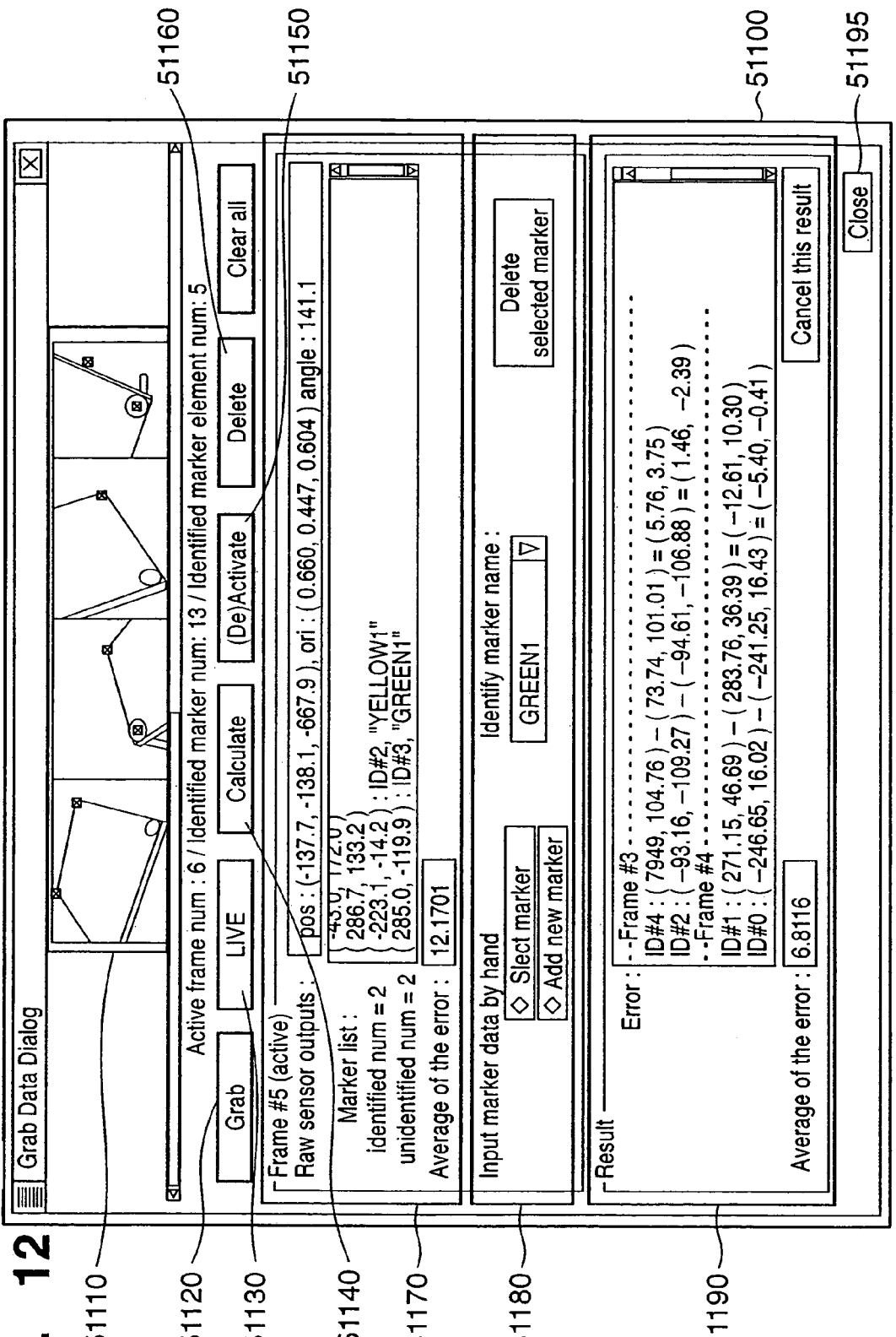
FIG. 12 is a view for explaining a data acquisition dialog of the GUI presented by the calibration apparatus according to the second embodiment.

FIG. 12 shows an example of the data acquisition dialog. A data acquisition dialog 51100 shown in FIG. 12, includes a data list display area 51110, data acquisition operation button 51120, display image switch button 51130, calibration information calculation button 51140, selected data deactivate/activate button 51150, selected data delete button 51160, selected data display area 51170, selected data manipulation area 51180, error display area 51190, and data acquisition dialog close button 51195.

The data list display area 51110 displays thumbnails of real images corresponding to the data list which has been acquired so far. When the user of this apparatus selects one of these thumbnails, data corresponding to that thumbnail is selected from the data list, and is displayed on the selected data display area 51170. Also, the data corresponding to that thumbnail is activated. The active data is to be processed upon depression of the selected data deactivate/activate button 51150 or selected data delete button 51160.

At this time, the image display area 51010 displays a real image corresponding to the data list. Since the data list display area 51110 displays thumbnails of real images, and it is difficult for the user of this apparatus to confirm details from the thumbnail, the image display area 51010 displays the real image without reducing. Also, the image coordinate position, world-coordinate position, and identification information of a marker selected from the data list are superimposed on the real image by the method described in the paragraphs of the image display area 51010.

The data acquisition button 51120 gives an instruction to this apparatus when the user of this apparatus selects a button region using a pointing device such as a mouse or the like. Upon depression of the data acquisition button 51120, the instruction unit 5115 issues a data acquisition command, and outputs a data acquisition request to the data management unit 5111. Also, a real image at that time is additionally displayed on the data list display area.

The display image switch button 51130 gives an instruction to this apparatus when the user of this apparatus selects a button region using a pointing device such as a mouse or the like. Upon depression of the display image switch button 51130, a mode of an image to be displayed on the image display area 51010 is switched. The user of this apparatus can select one of a "live video display mode" for displaying the currently acquired real image, and an "acquired data display mode" for displaying a real image currently selected on the data list display area 51110. Upon depression of the display image switch button 51130, if the current mode is the live video display mode, it is switched to the acquisition data display mode, and vice versa.

The calibration information calculation button 51140 gives an instruction to this apparatus when the user of this apparatus selects a button region using a pointing device such as a mouse or the like. Upon depression of the calibration information calculation button 51140, the instruction unit 5115 issues a calibration information calculation command, and outputs a calibration information calculation request to the calibration information calculation unit 5113.

The selected data deactivate/activate button 51150 gives an instruction to this apparatus when the user of this apparatus selects a button region using a pointing device such as a mouse or the like. Upon depression of the selected data deactivate/activate button 51150, when data (captured image) currently selected on the data list display area 51110 is active, that data is deactivated and is excluded from an object of the calibration information calculation process. If the currently selected data is inactive, that data is activated.

The selected data delete button 51160 gives an instruction to this apparatus when the user of this apparatus selects a button region using a pointing device such as a mouse or the like. Upon depression of the selected data delete button 51160, the instruction unit 5115 issues a data delete command, and outputs a data delete request to the data management unit 5111. Also, the thumbnail of the currently selected real image is erased from the data list display area 51110.

The selected data display area 51170 displays data selected by the user of this apparatus from the data list display area 51110.

Figure 13:
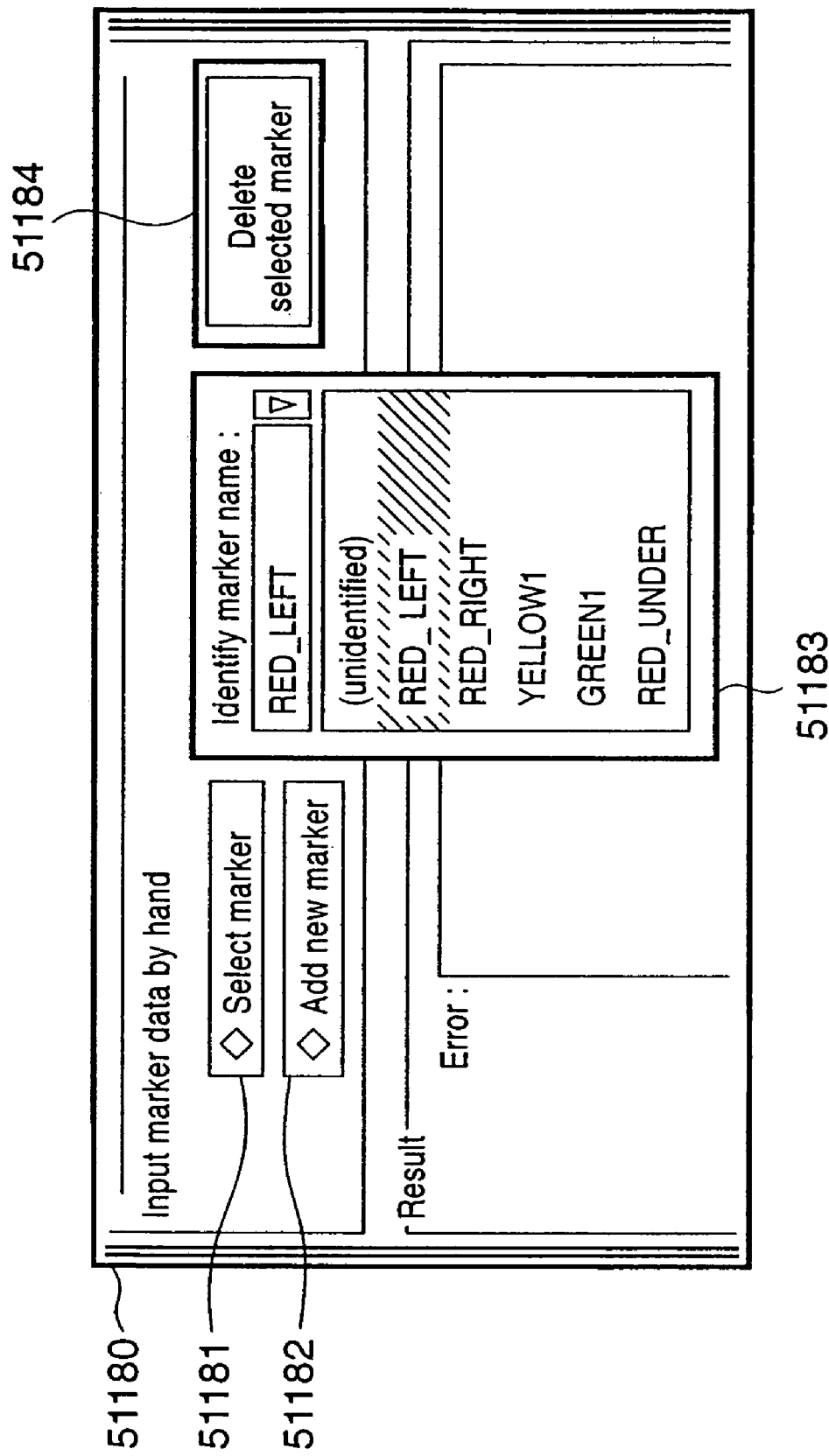
FIG. 13 is a view for explaining a selected data manipulation area on the dialog shown in FIG. 12.

The selected data manipulation area 51180 is used when the user of this apparatus manipulates the selected data. FIG. 13 shows details of the selected data manipulation area 51180.

The selected data manipulation area 51180 includes a marker select button 51181, marker add button 51182, marker identification information select menu 51183, and marker delete button 51184.

The marker select button 51181 gives an instruction to this apparatus when the user of this apparatus selects a button region using a pointing device such as a mouse or the like. Upon depression of the marker select button 51181, a manipulation mode is set in a "marker select mode". When the user of this apparatus selects the vicinity of the mark which indicates the coordinate position of the marker displayed on the image display area 51010 while the marker select mode is set, that marker is activated.

The marker add button 51182 gives an instruction to this apparatus when the user of this apparatus selects a button region using a pointing device such as a mouse or the like. Upon depression of the marker add button 51182, the manipulation mode is set in a "marker add mode". When the user of this apparatus selects an arbitrary portion of the image display area 51010 while the marker add mode is set, a new marker having that image coordinate position as the marker coordinate position is set, and is added to the data list. Furthermore, the added marker is activated.

The marker identification information select menu 51183 gives an instruction to this apparatus when the user of this apparatus selects a menu region using a pointing device such as a mouse or the like. Upon selection of the marker identification information select menu 51183, a list of marker identification information saved in the data list is displayed. In this embodiment, a character string indicating the marker name is used as the marker identification information. The user of this apparatus selects one marker identification information from the displayed list using a pointing device such as a mouse or the like. Upon selection of the marker identification information, the instruction unit 5115 issues a data identification command, and outputs the selected identification information and active marker information to the data management unit 5111 together with a data identification request.

The marker delete button 51184 gives an instruction to this apparatus when the user of this apparatus selects a button region using a pointing device such as a mouse or the like. Upon depression of the marker delete button 51184, the currently selected marker is deleted from the data list.

The error display area 51190 displays calibration errors obtained when the calibration information calculation unit 5113 calculates calibration information. In this embodiment, two different types of calibration errors, i.e., errors with respect to respective markers in the data list, and the average of errors of all data are displayed.

When calibration information calculated by the calibration information calculation unit 5113 has insufficient precision, or when the solution does not converge upon calculation of calibration information, the user of this apparatus can easily specify a marker as that cause by confirming calibration errors with respect to respective markers.

By confirming the average of errors of all data, the activation/deactivation results of data used in calculation of calibration information using the selected data deactivate/activate button can be evaluated.

The data acquisition dialog close button 51195 gives an instruction to this apparatus when the user of this apparatus selects a button region using a pointing device such as a mouse or the like. Upon selection of the data acquisition dialog close button 51195, the data acquisition dialog is closed. Even when the data acquisition dialog is closed, the contents of the data list are held.

Figure 14:
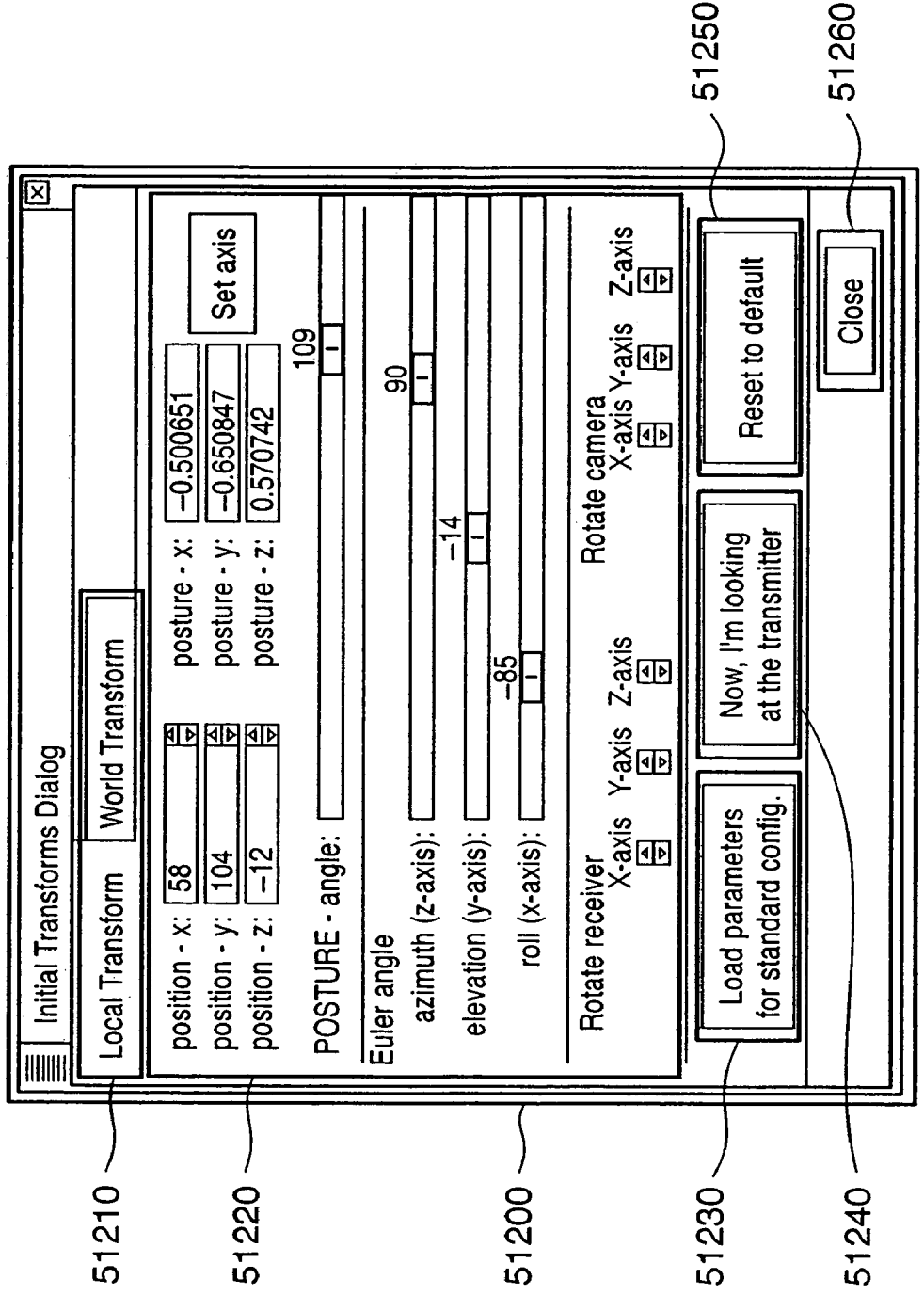
FIG. 14 is a view for explaining an initial value setup dialog of the GUI presented by the calibration apparatus according to the second embodiment.

FIG. 14 shows an example of an initial value setting dialog 51200. The initial value setting dialog includes parameter type select tabs 51210, a parameter setting area 51220, standard configuration designation button 51230, transmitter observation button 51240, reset button 51250, and initial value setting dialog close button 51260.

The parameter type select tabs 51210 are used to select the type of calibration information for which an initial value is to be set when the user of this apparatus selects one of regions using a pointing device such as a mouse or the like. There are two regions "Local Transform" and "World Transform". Upon selection of the "Local Transform" region, a calibration information mode is set in an "image sensing device-measurement point calibration information mode" that calculates first parameters required to transform the measurement value of the sensor into the position and posture of the image sensing unit. Upon selection of the "World Transform" region, the calibration information mode is set in a "world coordinate system-sensor coordinate system calibration information mode".

On the parameter setting area 51220, the user of this apparatus can set calibration information parameters corresponding to the current calibration information mode by various means such as buttons, sliders, spin buttons, numerical value input from a keyboard, and the like. In this embodiment, calibration information parameters are set by using one or a plurality of the following methods solely or in combination.

First, a vector that defines the position and rotation axis, and a rotation angle about that axis are designated.

Second, the position and Euler angles are designated.

Third, rotation angles about the X-, Y-, and Z-axes of the receiver 5301 viewed from the image sensing device 5302, and those about the X-, Y-, and Z-axes of the image sensing device 5302 viewed from the receiver 5301 are designated.

Upon completion of the setups of the calibration information parameters, the instruction unit 5115 issues a calibration information change command, and outputs a calibration information change request to the calibration information holding unit 5114.

The standard configuration designation button 51230 gives an instruction to this apparatus when the user of this apparatus selects a button region using a pointing device such as a mouse or the like. Upon designation of the standard configuration designation button 51230, the instruction unit 5115 issues a calibration information load command, and outputs a calibration information load request to the calibration information holding unit 5114.

The transmitter observation button 51240 gives an instruction to this apparatus when the user of this apparatus selects a button region using a pointing device such as a mouse or the like.

Upon selection of the transmitter observation button 51240, approximate values of Local Transform can be automatically calculated using the sensor measured value.

Figure 18A:
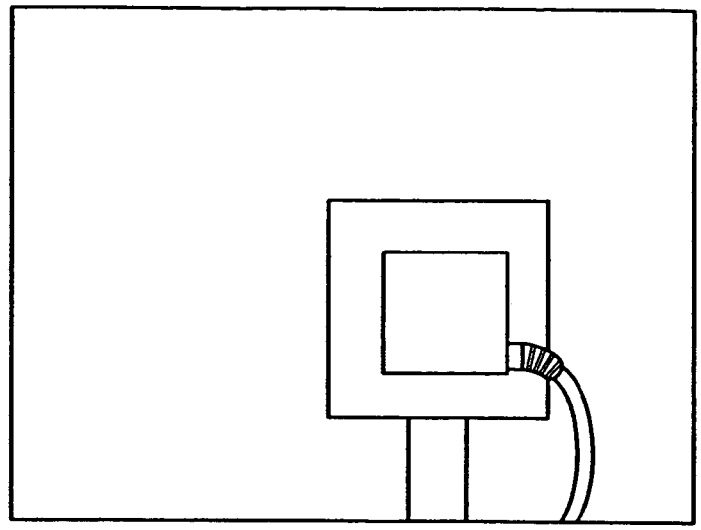
FIGS. 18A to 18C are views for explaining a sequence for automatically calculating approximate Local Transform values using a sensor measurement value in the calibration apparatus according to the second embodiment.

After the user adjusts the position and posture of a camera so that the image of the transmitter of the sensor is captured at nearly the center of the captured image, as shown in FIG. 18A, he or she clicks the transmitter observation button 51240. Based on the sensor measured value at that time, approximate values of Local Transform are calculated.

Upon clicking the transmitter observation button 51240, the instruction unit 5115 issues a calibration information calculation command, and outputs a calibration information calculation request to the calibration information calculation unit 5113. At this time, the calibration information calculation unit 5113 calculates calibration information (Local Transform) between the image sensing device 5302 and receiver 5301 using the only current sensor measured value without using the world coordinate position, image coordinate position, and identification information in the data list managed by the data management unit 5111.

Figure 18B:
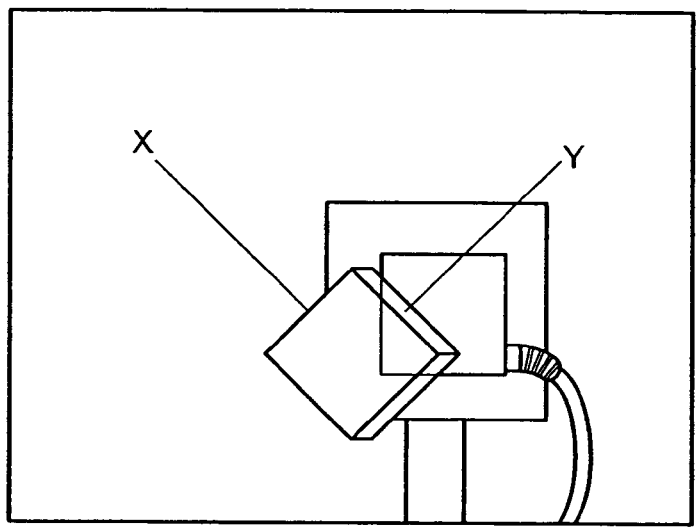

Theoretical values of the position and posture of the transmitter are calculated using the calculated approximate values, and a virtual image of the transmitter is generated based on the theoretical values. In addition, the virtual image of the transmitter is superimposed on the captured image at an image position corresponding to the theoretical values (FIG. 18B).

Figure 18C:
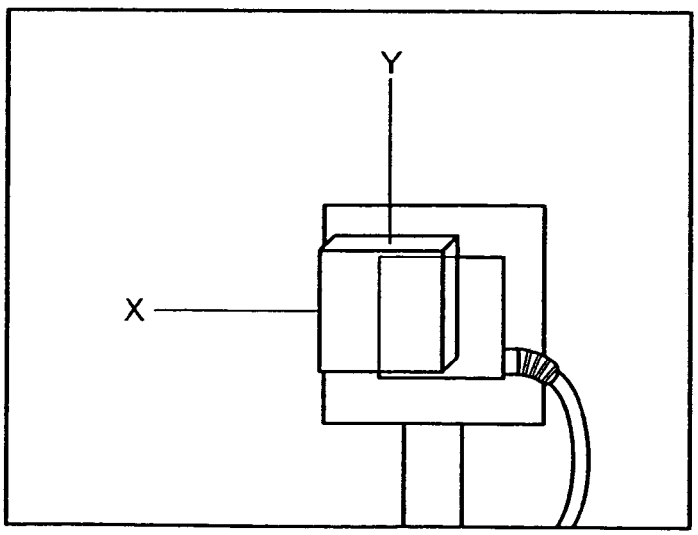

In Local Transform set using the transmitter observation button 51240, a rotation angle of the image sensing device in the Z-direction is indetermination. Hence, this parameter (a Z-posture component of Local Transform) is roughly adjusted using an azimuth (z-axis) slider bar (parameter setting area 51220). The virtual image of the transmitter is updated in real time in accordance with the adjustment result (FIG. 18C). Note that other parameters can be adjusted.

The reset button 51250 gives an instruction to this apparatus when the user of this apparatus selects a button region using a pointing device such as a mouse or the like. Upon designation of the reset button 51250, the instruction unit 5115 issues a reset command, and outputs a reset request to the calibration information holding unit 5114.

The initial value setting dialog close button 51260 gives an instruction to this apparatus when the user of this apparatus selects a button region using a pointing device such as a mouse or the like. Upon selection of the initial value setting dialog close button 51260, the initial value setting dialog is closed. Even after the initial value setting dialog is closed, calibration information can be held.

In this manner, by selecting the transmitter observation button 51240, approximate values of Local Transform can be easily and automatically calculated using the sensor measured value without requiring any special preparation processes, using a transmitter. Since the transmitter is an indispensable component in this system, the user need not execute any special processes for this process.

Figure 15:
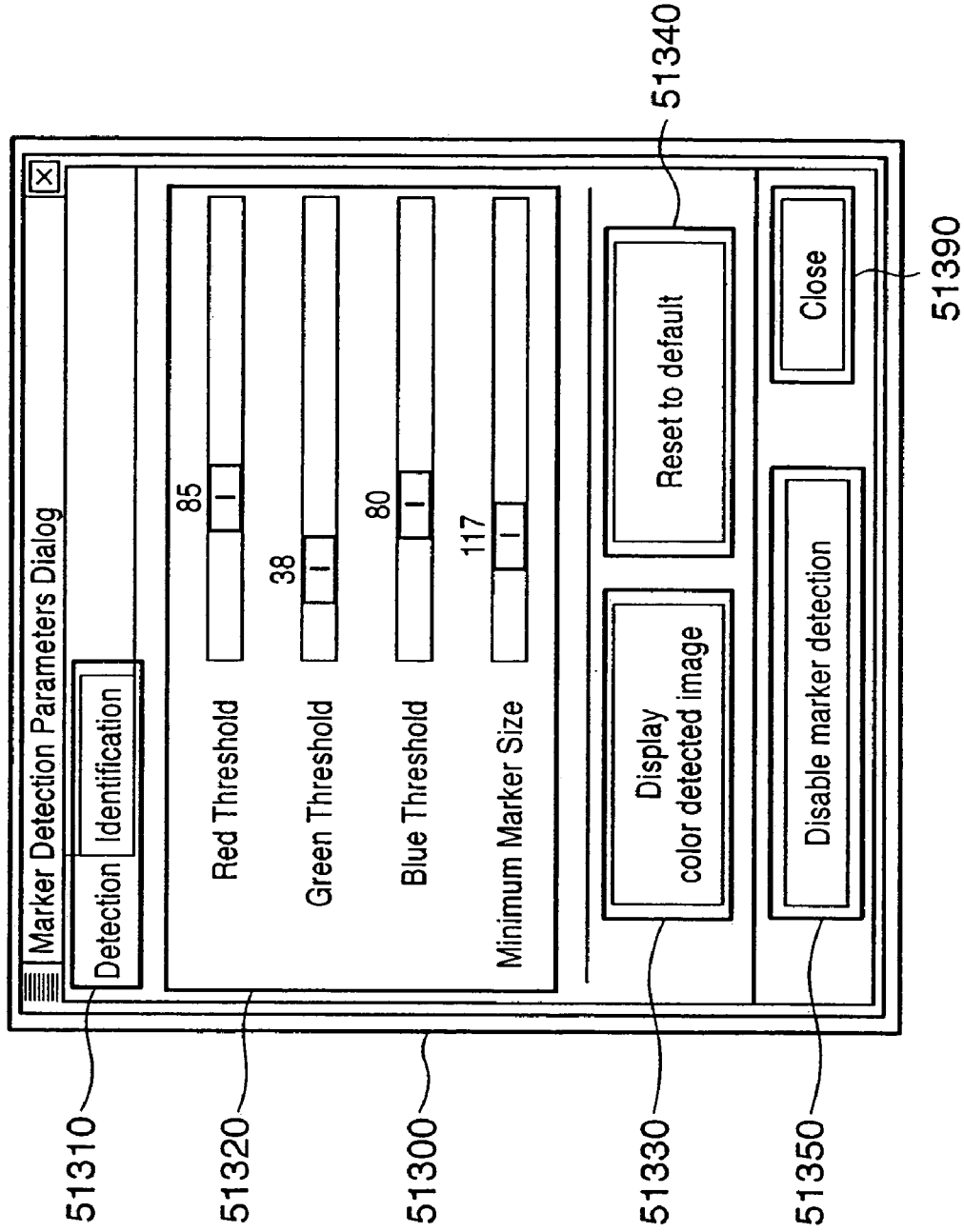
FIG. 15 is a view for explaining a detection parameter setup dialog of the GUI presented by the calibration apparatus according to the second embodiment.
Figure 16:
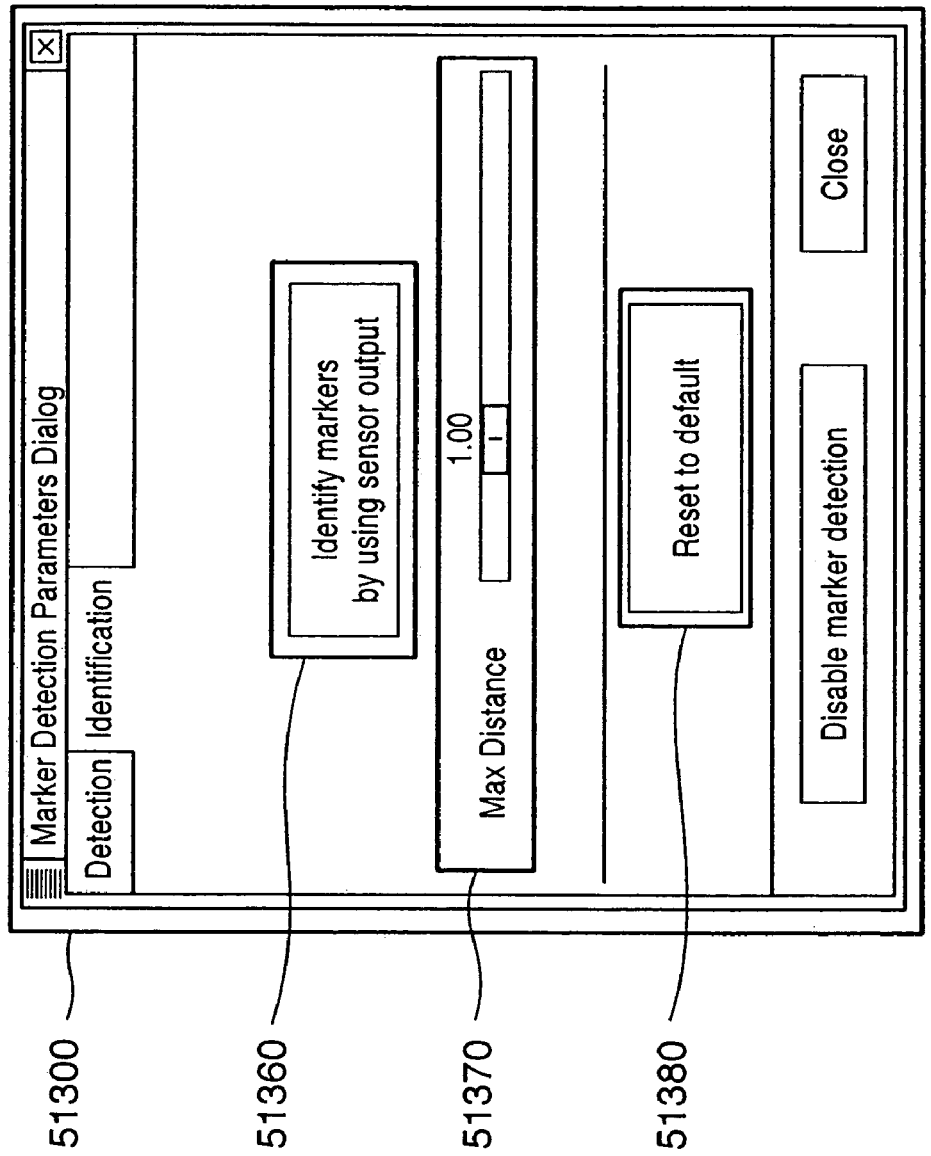
FIG. 16 is a view for explaining a detection parameter setup dialog of the GUI presented by the calibration apparatus according to the second embodiment.

FIGS. 15 and 16 show an example of a marker detection parameter setting dialog (marker detection parameters dialog) 51300. The marker detection parameter setting dialog 51300 includes parameter type select s 51310, a marker detection parameter setting area 51320, marker detection result display button 51330, marker detection parameter reset button 51340, marker detection disable button 51350, marker identification means switch button 51360, marker identification parameter setting area 51370, marker identification parameter reset button 51380, and marker detection parameter setting dialog close button 51390.

The parameter type select s 51310 are used to select and display one of a marker detection parameter setting dialog and marker identification parameter setting dialog, when the user of this apparatus selects one of regions using a pointing device such as a mouse or the like.

The marker detection parameter setting area 51320 is displayed when the marker detection parameter setting dialog is selected by the parameter type select 51310. On the marker detection parameter setting area 51320, the user of this apparatus sets threshold values of colors used to detect markers, and a minimum value of the number of pixels of a color region to be recognized as a marker using sliders, numerical value input boxes, and the like. The threshold values of colors are used to determine an arbitrary pixel as a marker candidate when color component values of that pixel exceed the threshold values.

In this embodiment, the threshold values are set for R, G, and B which indicate the luminance values of red, green, and blue. Alternatively, threshold values may be set for Y, Cr, and Cb components of a pixel. The minimum value of the number of pixels of a color region is used to inhibit a given color region from being recognized as marker, if the number of pixels of that color region is smaller than the set minimum value. In this embodiment, only the minimum value of the number of pixels of a color region is set. Also, a maximum value may be set at the same time, and the number of pixels which are recognized as marker candidates may be set to fall within a given range.

Figure 17:
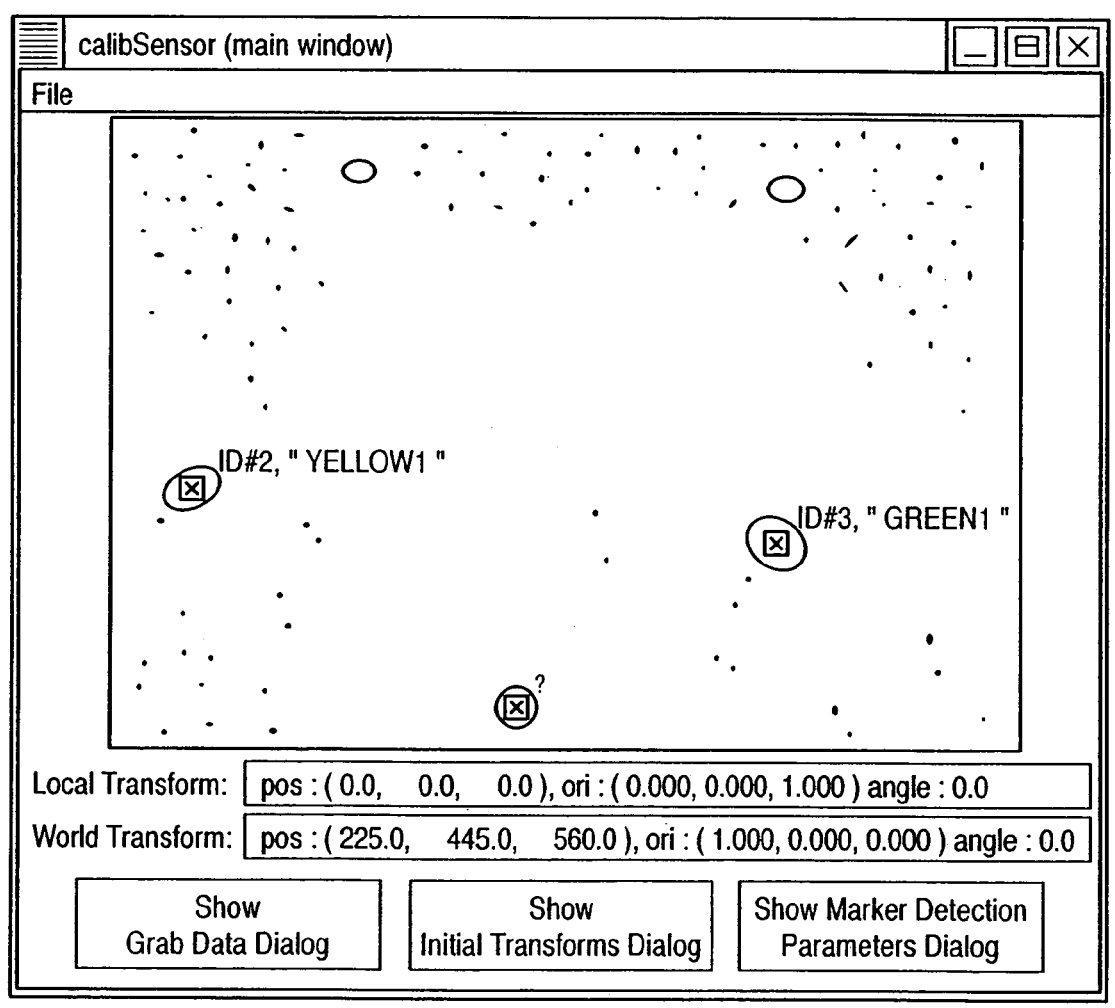
FIG. 17 is a view for explaining a state wherein a color extraction result image is displayed on an image display area of the GUI shown in FIG. 7 in the calibration apparatus according to the second embodiment.

The marker detection result display button 51330 is displayed when the marker detection parameter setting dialog is selected by the parameter type select 51310. The marker detection result display button 51330 gives an instruction to this apparatus when the user of this apparatus selects a button region using a pointing device such as a mouse or the like. Upon designation of the marker detection result display button 51330, one of a real image display mode and color extraction result image display mode is selected. In the real image display mode, a real image is displayed on the image display area 51010. In the color extraction result image display mode, a color extraction result image is displayed on the image display area 51010. In a color extraction result image shown in FIG. 17, only color regions extracted from the real image are displayed.

The marker detection parameter reset button 51340 is displayed when the marker detection parameter setting dialog is selected by the parameter type select 51310. The marker detection parameter reset button 51340 gives an instruction to this apparatus when the user of this apparatus selects a button region using a pointing device such as a mouse or the like. Upon designation of the marker detection parameter reset button 51340, the currently held marker detection parameters are discarded, and default values of marker detection parameters, which are set upon launching this apparatus, are set as current marker detection parameters.

The marker detection disable button 51350 is displayed when the marker detection parameter setting dialog is selected by the parameter type select 51310. The marker detection disable button 51350 gives an instruction to this apparatus when the user of this apparatus selects a button region using a pointing device such as a mouse or the like. Upon selection of the marker detection disable button 51350, a marker detection process is disabled.

The marker identification means switch button 51360 is displayed when the marker identification parameter setting dialog is selected by the parameter type select 51310. The marker identification means switch button 51360 gives an instruction to this apparatus when the user of this apparatus selects a button region using a pointing device such as a mouse or the like. Upon selection of the marker identification means switch button 51360, a marker identification function using the sensor measured value is selectively activated/deactivated. The marker identification function calculates the distance between the image coordinate position of the detected marker, and a coordinate position obtained by projecting the world coordinate position of the marker held by the world coordinate holding unit 5110 onto the image sensing surface of the image sensing device 5302, on the basis of the current sensor measured value and calibration information, and automatically identifies the marker when the minimum value of the distance is equal to or smaller than a maximum allowable value.

The marker identification parameter setting area 51370 is displayed when the marker identification parameter setting dialog is selected by the parameter type select 51310. On the marker identification parameter setting area 51370, the user of this apparatus sets a maximum allowable distance used to identify a maker using a slider, numerical value input box, and the like.

The marker identification parameter reset button 51380 is displayed when the marker identification parameter setting dialog is selected by the parameter type select 51310. The marker identification parameter reset button 51380 gives an instruction to this apparatus when the user of this apparatus selects a button region using a pointing device such as a mouse or the like. Upon designation of the marker identification parameter reset button 51380, the currently held marker identification parameters are discarded, and default values of marker identification parameters, which are set upon launching this apparatus, are set as current marker identification parameters.

The marker detection parameter setting dialog close button 51390 gives an instruction to this apparatus when the user of this apparatus selects a button region using a pointing device such as a mouse or the like. Upon selection of the marker detection parameter setting dialog close button 51390, the detection parameter setting dialog 51390 is closed. Even after the detection parameter setting dialog is closed, marker detection parameters and marker identification parameters are held.

Figure 19:
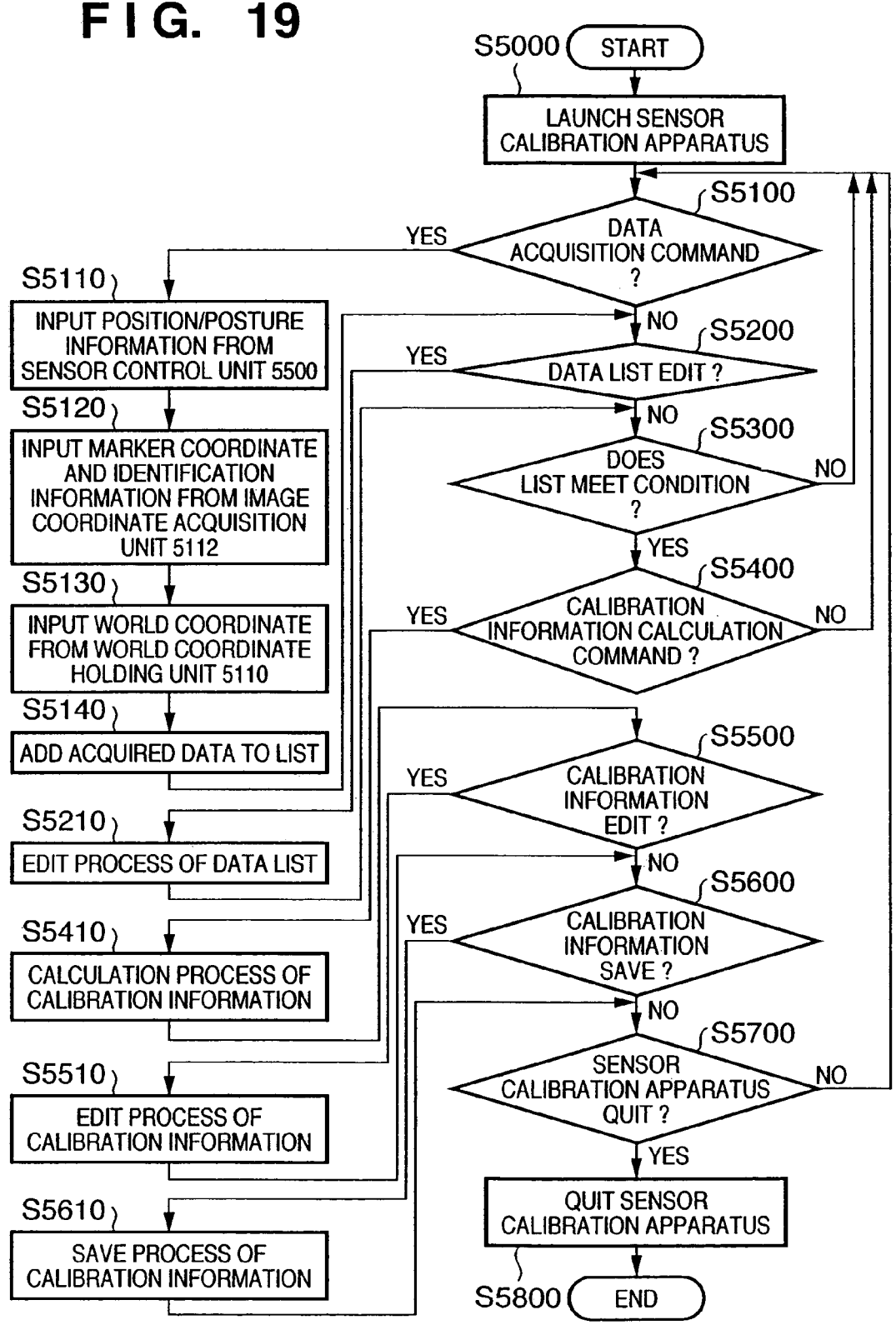
FIG. 19 is a flow chart showing the processing sequence of a sensor calibration apparatus according to the second embodiment.

FIG. 19 is a flow chart showing processes to be executed by the sensor calibration apparatus of this embodiment. Note that a program code that implements processes according to this flow chart is stored in a storage device such as the disk device 5105, RAM 5102, or the like in the apparatus of this embodiment, and is read out and executed by the CPU 5101.

In step S5000, the sensor calibration apparatus of this embodiment is launched.

The instruction unit 5115 checks in step S5100 if the user of this apparatus has input a data acquisition command. If the data acquisition command has been input, the flow advances to step S5110.

In step S5110, the data management unit 5111 receives the measured values of the current position and posture of the receiver 5301 from the sensor control unit 5500.

In step S5120, the data management unit 5111 receives the identification information and image coordinate position of a marker which appears on a captured image sensed by the image sensing device. 5302 via the image coordinate acquisition unit 5112. If a plurality of markers appear on the captured image, this step is repeated for these markers.

In step S5130, the data management unit 5111 adds input data to the data list for each detected marker.

The instruction unit 5115 checks in step 5200 if the user of this apparatus has made an edit operation of the data list. If the edit operation of the data list has been made, the flow advances to step S5210.

In step S5210, the instruction unit 5115 issues a command corresponding to the edit operation of the data list made by the user of this apparatus, thereby editing the data list. For example, the data list edit operation includes an operation for selecting an element of the data list, an operation for deleting the selected element from the data list, an operation for adding a new marker to the data list, an operation for deleting an existing marker from the data list, and an operation for giving identification information to the existing marker in the data list to identify that marker.

It is checked in step S5300 if the data list acquired so far by the calibration information calculation unit 5113 has information that suffices to calculate calibration information. If the data list does not meet a given condition, the flow returns to step S5100 to wait for input of the next data acquisition command. On the other hand, if the data list meets a calibration information calculation condition, the flow advances to step S5400. The calibration information calculation condition may include, for example, that data associated with three or more points of different markers be acquired, data be acquired at a plurality of viewpoint positions, and the total number of data be 6 or more. However, since the precision of calculated calibration information improves with increasing variety of input data, a condition that requires more data may be set.

It is checked in step S5400 if the user of this apparatus has input a calibration information calculation command. If the calibration information calculation command has been input, the flow advances to step S5410; otherwise, the flow returns to step S5100 to wait for input of the next data acquisition command.

In step S5410, the calibration information calculation unit 5113 executes a calibration information calculation process.

The instruction unit 5115 checks in step S5500 if the user of this apparatus has made an edit operation of calibration information. If the edit operation of calibration information has been made, the flow advances to step S5510.

In step S5510, the instruction unit 5115 issues a command corresponding to the calibration information edit operation made by the user of this apparatus, thus editing calibration information. For example, the calibration information edit operation includes an operation for changing parameters of calibration information, an operation for loading calibration information, and an operation for resetting calibration information.

The instruction unit 5115 checks in step S5600 if the user of this apparatus has made a save operation of calibration information. If the save operation of calibration information has been made, the flow advances to step S5610.

In step S5610, the instruction unit 5115 outputs a file save request to the calibration information holding unit 5114 to output the currently held calibration information to the disk device 5105.

The instruction unit 5115 checks in step S5700 if the user of this apparatus has made a quit operation of this apparatus. If the quit operation of this apparatus has been made, the flow advances to step S5800; otherwise, the flow returns to step S5100.

In step S5800, a process for quitting this apparatus is executed.

Figure 20:
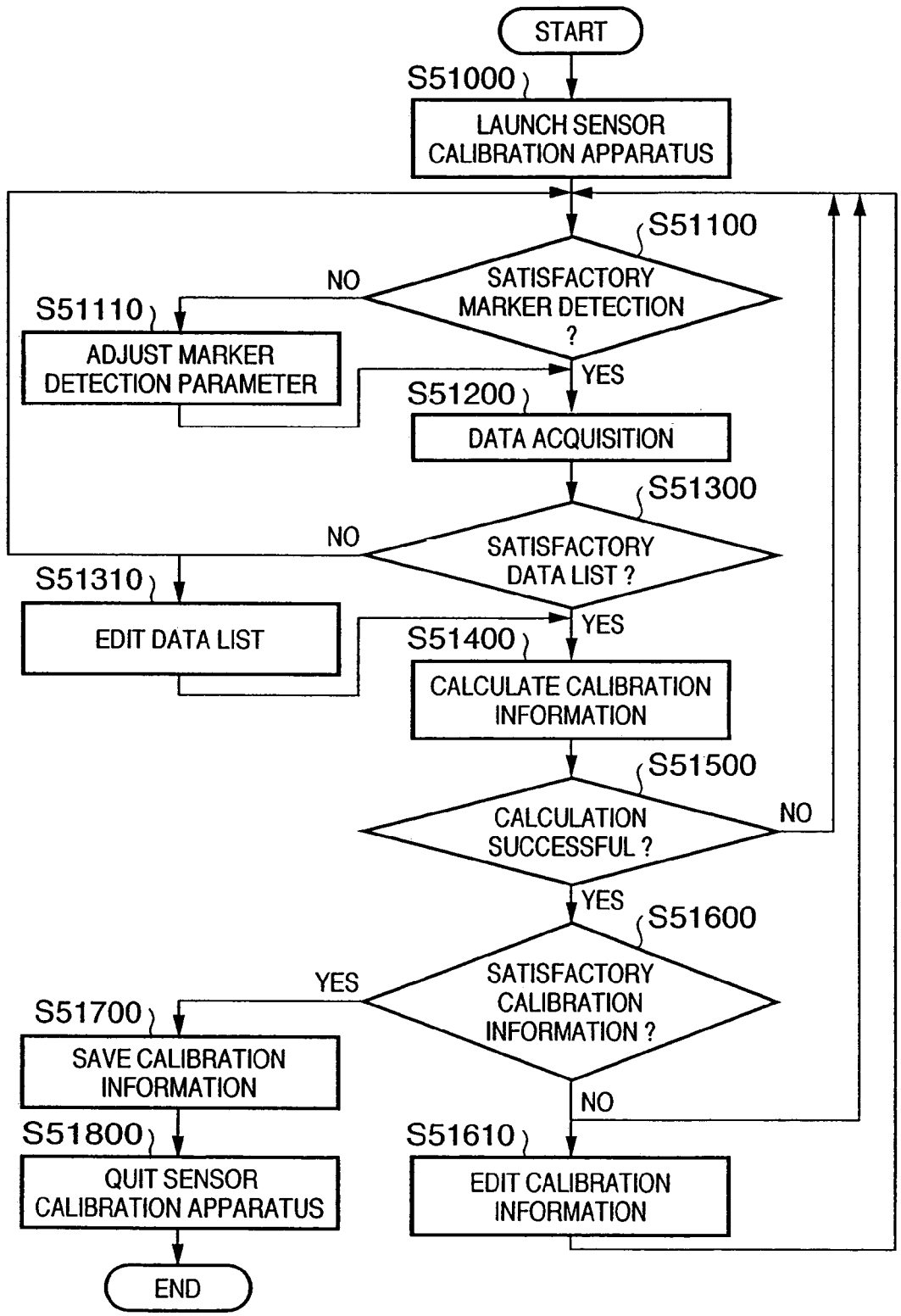
FIG. 20 is a flow chart showing the sequence when the user of the sensor calibration apparatus uses the sensor calibration apparatus in the second embodiment.

FIG. 20 is a flow chart of standard operations made when the user of the sensor calibration apparatus of this embodiment calibrates the sensor using this apparatus.

In step S51000, the user of this apparatus launches the sensor calibration apparatus of this embodiment.

In step S51100, the user of this apparatus senses an image of a given marker using the image sensing device 5302. The user of this apparatus confirms whether or not the image coordinate acquisition unit 5112 of this apparatus correctly specifies the image coordinate position and identification information of the marker. If the image coordinate position and identification information can be correctly specified, the flow advances to step S51200; otherwise, the flow advances to step S51110.

In step S51110, the user of this apparatus gives instructions for adjusting marker detection parameters and marker identification parameters to the instruction unit 5115 using, e.g., the marker detection parameter setting dialog 51300.

In step S51200, the user of this apparatus makes the instruction unit 5115 issue a data acquisition command using, e.g., the data acquisition button 51120.

The user of this apparatus confirms in step S51300 whether or not respective data of the acquired data list are satisfactory. If the data are satisfactory, the flow advances to step S51400; otherwise, the flow advances to step S51310 or returns to step S51100 depending on circumstances.

In step S51310, the user of this apparatus gives an instruction for a data list edit operation to the instruction unit 5115 using, e.g., the data acquisition dialog 51100.

In step S51400, the user of this apparatus makes the instruction unit 5115 issue a calibration information calculation command using, e.g., the calibration information calculation button 51140.

The user of this apparatus confirms in step S51500 whether or not the calibration information calculation unit 5113 correctly calculates calibration information. If the calibration information is calculated correctly, the flow advances to step S51600; otherwise, the flow returns to step S51100.

The user of this apparatus confirms in step S51600 whether or not the calibration information calculated by the calibration information calculation unit 5113 is satisfactory. If the calibration information is satisfactory, the flow advances to step S51700; otherwise, the flow advances to step S51610 or returns to step S51100 depending on circumstances.

In step S51610, the user of this apparatus gives an instruction for editing calibration information to the instruction unit 5115 using, e.g., the initial value setting dialog 51200.

In step S51700, the user of this apparatus makes the instruction unit 5115 issue a file save command using, e.g., the save sub-menu 51050.

In step S51800, the user of this embodiment makes this apparatus quit using, e.g., the quit sub-menu 51060.

Third Embodiment

Figure 21:
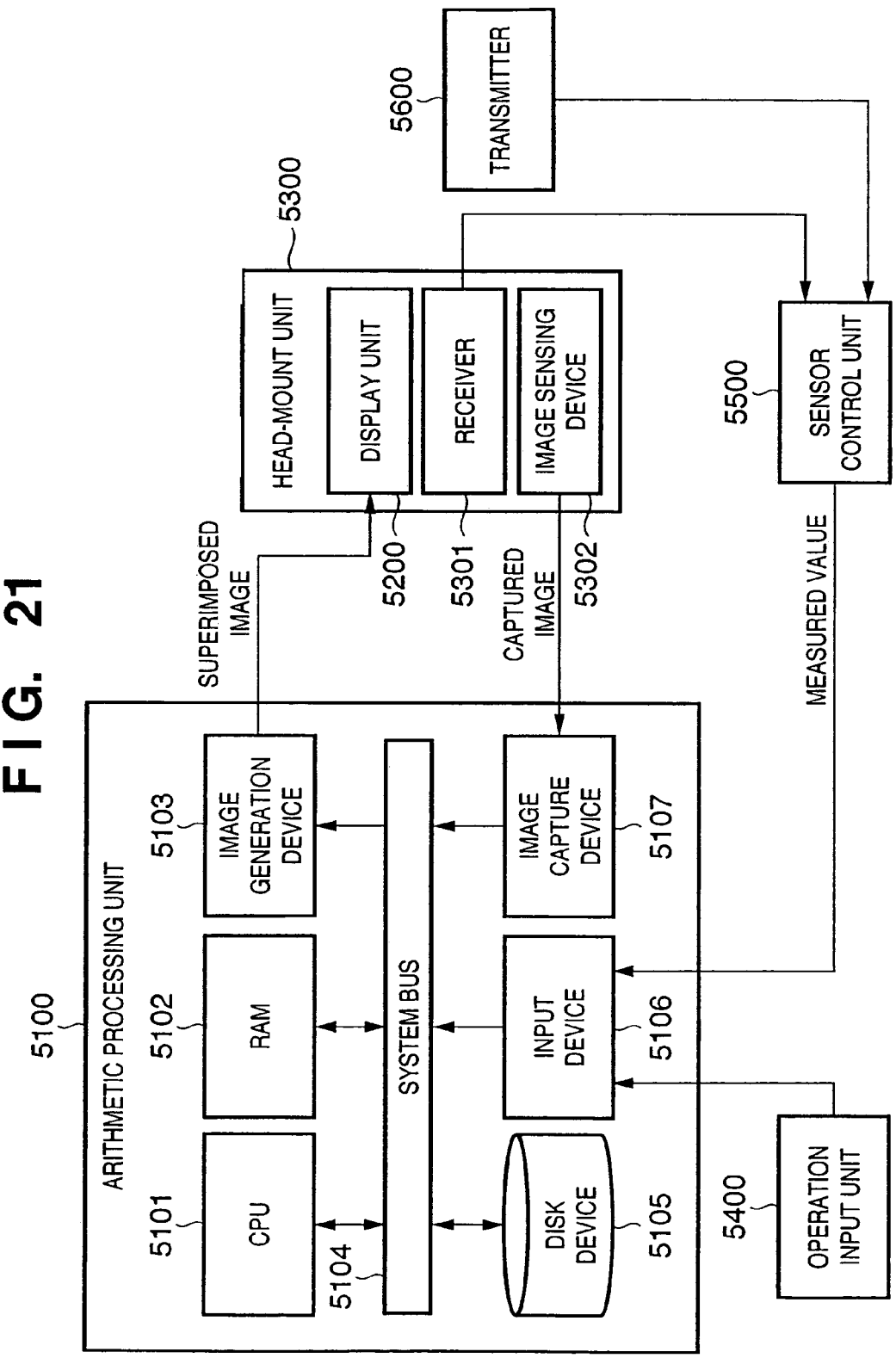
FIG. 21 is a schematic block diagram for explaining the arrangement of a sensor calibration apparatus according to the third embodiment.

FIG. 21 is a schematic block diagram showing the arrangement of a sensor calibration apparatus according to the third embodiment. In the second embodiment, the display unit 5200 is arranged outside the head-mount unit 5300. In the third embodiment, the display unit 5200 is included in the head-mount unit 5300. Such arrangement can be implemented when a display device such as an HMD or the like that the user can wear on the head is used as the display unit 5200. In the third embodiment, since the head-wearable display device is used, the user of this apparatus can calibrate under the same condition as that upon using an image display apparatus which presents mixed reality.

Fourth Embodiment

Figure 22:
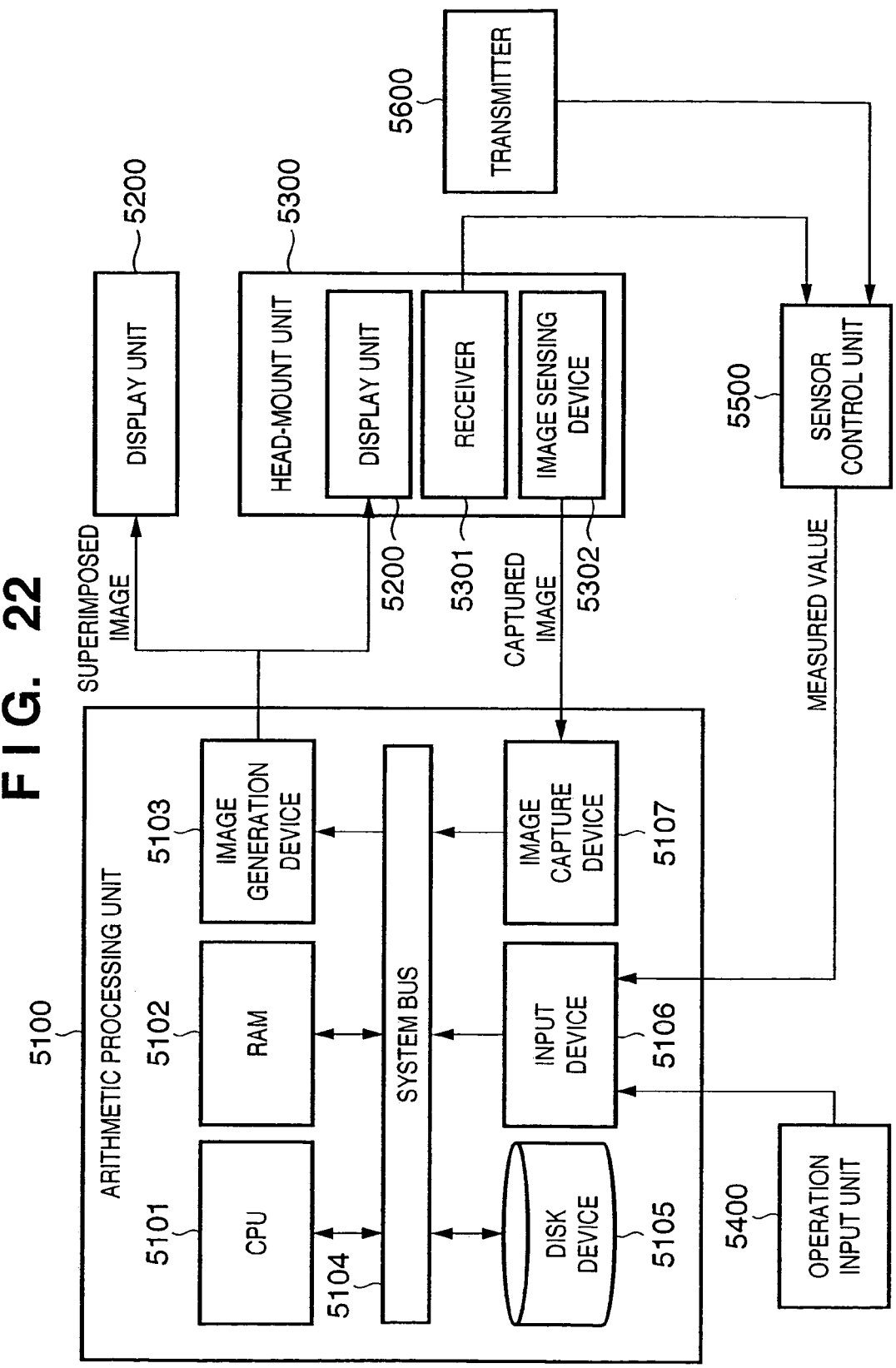
FIG. 22 is a schematic block diagram for explaining the arrangement of a sensor calibration apparatus according to the fourth embodiment.

FIG. 22 is a schematic block diagram showing the arrangement of a sensor calibration apparatus according to the fourth embodiment. In the fourth embodiment, the display unit 5200 comprises both a display device which is arranged outside the head-mount unit 5300 in the second embodiment, and a display device that the user of this apparatus wears on the head in the third embodiment. For example, an HMD normally has lower resolution than a normal display device such as a CRT monitor, liquid crystal monitor, or the like. When such display device is used, the user of this apparatus can hardly gives instructions to this apparatus using the GUI that has been explained in the second embodiment. In such case, for example, this apparatus may be used by two users.

That is, the display device which is observed by the first user of this apparatus and is arranged outside the head-mount unit 5300 (the display unit in the second embodiment) displays the GUI that has been explained in the second embodiment. The display device that the second user of this apparatus wears on the head (the display unit in the third embodiment) displays a real image, a composite image formed by superposing various kinds of information and CG on the real image, marker color extraction images, and the like except for the GUI that has been explained in the second embodiment. Since the first user operates this apparatus, and the second user adjusts the positions and postures of the image sensing device 5302 and receiver 5301, a calibration work can be efficiently done.

Another Embodiment

It goes without saying that the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. It goes without saying that the functions of the above-mentioned embodiments may be implemented not only by executing the readout program code by the computer but also by some or all of actual processing operations executed by an operating system (OS) running on the computer on the basis of an instruction of the program code.

Furthermore, it goes without saying that a case is included within the scope of the invention where after a program code, read out from storage medium, has been stored in memory provided on a function expansion board of a computer or a function expansion unit connected to a computer, the CPU or the like on the feature expansion board or unit executes some or all of the actual processing based on the designation of the program code to implement the embodiments.

When the present invention is applied to the storage medium, that storage medium stores the program codes corresponding to the aforementioned flow charts (shown in FIG. 4 and/or FIG. 15).

As described above, according to the present invention, parameters (calibration information) required to transform the position and posture of an image sensing unit measured by a sensor into those on the world coordinate system can be easily and accurately acquired without using any special calibration tool.

Especially, since the user can select a captured image used upon calculating parameters from a plurality of captured images, he or she can exclude an inappropriately captured image upon calculating parameters.

According to the invention of claim 14, since errors are displayed for respective detected markers, an inappropriately captured image can be appropriately selected.

As many apparently widely different embodiments of the present invention can be made without departing from the spirit and scope thereof, it is to be understood that the invention is not limited to the specific embodiments thereof except as defined in the appended claims.

What is claimed is:

1. An information processing method comprising the steps of:
holding values of coordinate positions of a plurality of markers on a predetermined coordinate system;
acquiring a captured image obtained by sensing an image of a real space on which the markers are arranged using an image sensing unit;
adjusting parameters used upon detecting markers, based on a user's instruction;
detecting the markers included in the captured image;
identifying the markers that have been detected on the basis of the values; and
combining information corresponding to an identification result in said identifying step, on the captured image, and displaying a resulting combined image.

2. A method according to claim 1, wherein combined information resulting from the combining indicates positions of the markers that have been detected in the captured image.

3. A method according to claim 1, wherein combined information resulting from the combining indicates values of coordinate positions of markers corresponding to the markers identified on the captured image.

4. A method according claim 1, wherein combined information resulting from the combining indicates that markers that have been detected cannot be identified on the captured image, when such markers cannot be identified.

5. A method according to claim 1, wherein the parameters include threshold values of colors and size information of each color region.

6. A method according to claim 1, further comprising the step of identifying parameters of markers that have been detected.

7. A program stored on a computer-readable storage medium, said program including code having instructions which cause a computer to execute an information processing method according to claim 1.

8. A computer-readable storage medium which stores a program, the program having code including instructions which cause a computer to execute an information processing method according to claim 1.

9. An information processing apparatus comprising:
a holding unit adapted to hold values of coordinate positions of a plurality of markers on a predetermined coordinate system;
an acquiring unit adapted to acquire a captured image obtained by sensing an image of a real space on which the markers are arranged using an image sensing unit;
an adjusting unit adapted to adjust parameters used upon detecting markers based on a user's instruction;
a detecting unit adapted to detect the markers included in the captured image;
an identifying unit adapted to identify the markers detected by said detecting unit on the basis of the values held by said holding unit; and
a combining unit adapted to combine information corresponding to an identification result obtained by said identifying unit on the captured image, and displaying a resulting combined image.

10. An information processing method for calculating calibration information used to transform a position and orientation of an image capturing device measured by a sensor into that of a world coordinate system, including steps of
acquiring a plurality of images captured in a physical space where a plurality of markers are arranged, by the capturing device, wherein world coordinates of the each of marker is known;
acquiring a plurality of measured values, from the sensor, corresponding to each of the captured images;
detecting image coordinates of markers included in the captured image;
selecting the captured image to be used to calculate the calibration information from the acquired captured images according to a user's instruction;
calculating the calibration information using the measured value of the selected captured image, the detected image coordinates of each of the markers included in the selected captured image, and the world coordinates of each of the markers;
combining a captured image with a sign indicating image coordinates of each of markers included in the captured image, identification information of each of the markers included in the captured image, and a sign indicating image coordinates calculated from world coordinates of each of the markers included in the captured image by using the calculated calibration information; and
displaying the combined image.

11. A method according to claim 10, wherein the image coordinate of the marker is automatically detected by analyzing the captured image, and further comprising, deleting the detected image coordinate of the marker, and adding an image coordinate of a marker included in the captured image, according to user's instruction based on the displayed image.

12. The method according to claim 10, wherein the displayed image corresponds to the selected captured image from the plurality of captured images according to user's instruction.

13. The method according to claim 10, further comprising a step of displaying errors of the markers based on the calibration information and displaying an average value of the errors.

14. The method according to claim 10, further comprising a step of adjusting detection condition to detect the image coordinate, according to user's instruction.

15. A computer-readable storage medium which stores a program that when executed in a computer performs an information processing method, the method comprising the steps of:
holding values of coordinate positions of a plurality of markers on a predetermined coordinate system;
acquiring a captured image obtained by sensing an image of a real space on which the markers are arranged using an image sensing unit;
adjusting parameters used upon detecting markers, based on a user's instruction;
detecting the markers included in the captured image;
identifying the markers that have been detected on the basis of the values; and
combining information corresponding to an identification result in said identifying step, on the captured image, and displaying a resulting combined image.

16. An information processing apparatus comprising:
a holding unit for holding values of coordinate positions of a plurality of markers on a predetermined coordinate system;
an acquiring unit for acquiring a captured image obtained by sensing an image of a real space on which the markers are arranged using an image sensing unit;
an adjusting unit for adjusting parameters used upon detecting markers, based on a user's instruction;
a detection unit for detecting the markers included in the captured image;
an identifying unit for identifying the markers that have been detected on the basis of the values; and
a combining unit for combining information corresponding to an identification result obtained in said identifying unit, on the captured image, and for displaying a resulting combined image.

* * * * *